US012143299B2

(12) United States Patent
Yerramalli et al.

(10) Patent No.: US 12,143,299 B2
(45) Date of Patent: Nov. 12, 2024

(54) UPPER ANALOG MEDIA ACCESS CONTROL (MAC-A) LAYER FUNCTIONS FOR ANALOG TRANSMISSION PROTOCOL STACK

(71) Applicant: QUALCOMM Incorporated, San Diego, CA (US)

(72) Inventors: Srinivas Yerramalli, San Diego, CA (US); Taesang Yoo, San Diego, CA (US); Rajat Prakash, San Diego, CA (US); Junyi Li, Fairless Hills, PA (US); Eren Balevi, San Diego, CA (US); Hamed Pezeshki, San Diego, CA (US); Tao Luo, San Diego, CA (US); Xiaoxia Zhang, San Diego, CA (US); Aziz Gholmieh, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 17/584,345

(22) Filed: Jan. 25, 2022

(65) Prior Publication Data

US 2023/0239239 A1 Jul. 27, 2023

(51) Int. Cl.
*H04L 45/00* (2022.01)
*G06N 3/098* (2023.01)
(Continued)

(52) U.S. Cl.
CPC ............. *H04L 45/66* (2013.01); *G06N 3/098* (2023.01); *G06N 20/20* (2019.01); *H04L 45/52* (2013.01); *H04W 40/02* (2013.01)

(58) Field of Classification Search
CPC ..... H04L 45/66; H04L 45/52; H04L 25/0254; H04L 2025/03464; G06N 20/20;
(Continued)

(56) References Cited

U.S. PATENT DOCUMENTS 6,847,654 B2 * 1/2005 Zegelin ................. H04W 88/02
370/463
11,071,094 B2 * 7/2021 Han .................. H04W 72/0453
(Continued)

FOREIGN PATENT DOCUMENTS

WO WO-2021214863 A1 * 10/2021

OTHER PUBLICATIONS

Chen et al., "Artificial Neural Networks-Based Machine Learning for Wireless Networks: A Tutorial," IEEE Communications Surveys & Tutorials, vol. 21, No. 4, pp. 3039-3071, Fourth Quarter 2019 (Year: 2019).*
(Continued)

*Primary Examiner* — Un C Cho
*Assistant Examiner* — Lalita W Pace
(74) *Attorney, Agent, or Firm* — QUALCOMM Incorporated

(57) ABSTRACT

A method of wireless communication by a user equipment (UE) includes generating, by an upper analog media access control (MAC-A) layer of a protocol stack, a data packet with a header and a data field. The header indicates a neural network identifier (ID) and a request ID. The data field includes gradient data for a federated learning iteration. The method also includes transferring the data packet to lower layers of the protocol stack for transmission to a network device across a wireless network.

30 Claims, 18 Drawing Sheets

(51) Int. Cl.
*G06N 20/20* (2019.01)
*H04L 45/52* (2022.01)
*H04W 40/02* (2009.01)

(58) Field of Classification Search
CPC ......... G06N 3/098; G06N 3/02; H04W 40/02;
H04B 17/3913; H04Q 2213/13343
See application file for complete search history.

(56) References Cited

U.S. PATENT DOCUMENTS

| | | | |
|---|---|---|---|
| 2009/0092039 A1* | 4/2009 | Niu | H04L 5/0044 370/208 |
| 2010/0189103 A1* | 7/2010 | Bachmann | H04L 69/04 370/465 |
| 2016/0005077 A1* | 1/2016 | McDevitt | H04W 4/021 705/14.58 |
| 2021/0216866 A1* | 7/2021 | Ito | G06N 3/04 |
| 2021/0295168 A1* | 9/2021 | Xu | G06F 17/18 |
| 2022/0070722 A1* | 3/2022 | Wang | H04W 28/0289 |
| 2022/0159525 A1* | 5/2022 | Chou | H04W 24/02 |
| 2022/0361037 A1* | 11/2022 | Wei | H04W 28/0268 |
| 2022/0398431 A1* | 12/2022 | Tanaka | G06N 3/04 |
| 2023/0038310 A1* | 2/2023 | Yang | G06N 3/047 |
| 2023/0164817 A1* | 5/2023 | Bhamri | G06N 3/063 370/329 |
| 2023/0177349 A1* | 6/2023 | Balakrishnan | G06N 3/08 706/25 |
| 2023/0262490 A1* | 8/2023 | Geng | G06N 20/00 370/254 |
| 2023/0325679 A1* | 10/2023 | Wang | G06N 3/045 706/25 |

OTHER PUBLICATIONS

Khan et al., "Federated Learning for Internet of Things: Recent Advances, Taxonomy, and Open Challenges," IEEE Communications Surveys & Tutorials, vol. 23, No. 3, pp. 1759-1799, Third Quarter 2021 (Year: 2021).*

Chen et al., "A Joint Learning and Communications Framework for Federated Learning Over Wireless Networks," IEEE Transactions on Wireless Communications, vol. 20, No. 1, pp. 269-283, Jan. 2021 (Year: 2021).*

Tran et al., "Federated Learning over Wireless Networks: Optimization Model Design and Analysis," IEEE Infocom 2019—IEEE Conference on Computer Communications, Paris, France, 2019, pp. 1387-1395. (Year: 2019).*

G. Zhu, Y. Du, D. Gündüz and K. Huang, "One-Bit Over-the-Air Aggregation for Communication-Efficient Federated Edge Learning: Design and Convergence Analysis," in IEEE Transactions on Wireless Communications, vol. 20, No. 3, pp. 2120-2135, Mar. 2021. (Year: 2021).*

Kulin et al., A Survey on Machine Learning-Based Performance Improvement of Wireless Networks: PHY, MAC and Network Layer, Electronics 2021, pp. 1-63 (Year: 2021).*

Chen M., et al., "Distributed Learning in Wireless Networks: Recent Progress and Future Challenges", IEEE Journal on Selected Areas in Communications, vol. 39, No. 12, Dec. 2021, pp. 3579-3605.

International Search Report and Written Opinion—PCT/US2023/010614—ISA/EPO—May 11, 2023.

Zhu G., et al., "One-Bit Over-the-Air Aggregation for Communication-Efficient Federated Edge Learning: Design and Convergence Analysis", IEEE Transactions on Wireless Communications, vol. 20, No. 3, Mar. 2021, pp. 2120-2135.

* cited by examiner

UPPER ANALOG MEDIA ACCESS CONTROL (MAC-A) LAYER FUNCTIONS FOR ANALOG TRANSMISSION PROTOCOL STACK

FIELD OF THE DISCLOSURE

The present disclosure relates generally to wireless communications, and more specifically to upper analog media access control (MAC-A) layer functions for an analog transmission protocol stack.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrow band (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

In aspects of the present disclosure, a method of wireless communication by a user equipment (UE) includes generating, by an upper analog media access control (MAC-A) layer of a protocol stack, a data packet with a header and a data field. The header indicates a neural network identifier (ID) and a request ID. The data field including gradient data for a federated learning iteration. The method also includes transferring the data packet to lower layers of the protocol stack for transmission to a network device across a wireless network.

Other aspects of the present disclosure are directed to an apparatus for wireless communication by a user equipment (UE) having a memory and one or more processor(s) coupled to the memory. The processor(s) is configured to generate, by an upper analog media access control (MAC-A) layer of a protocol stack, a data packet with a header and a data field. The header indicates a neural network identifier (ID) and a request ID. The data field includes gradient data for a federated learning iteration. The processor(s) is also configured to transfer the data packet to lower layers of the protocol stack for transmission to a network device across a wireless network.

Other aspects of the present disclosure are directed to an apparatus for wireless communication by a user equipment (UE) including means for generating, by an upper analog media access control (MAC-A) layer of a protocol stack, a data packet with a header and a data field. The header indicates a neural network identifier (ID) and a request ID. The data field includes gradient data for a federated learning iteration. The apparatus also includes means for transferring the data packet to lower layers of the protocol stack for transmission to a network device across a wireless network.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
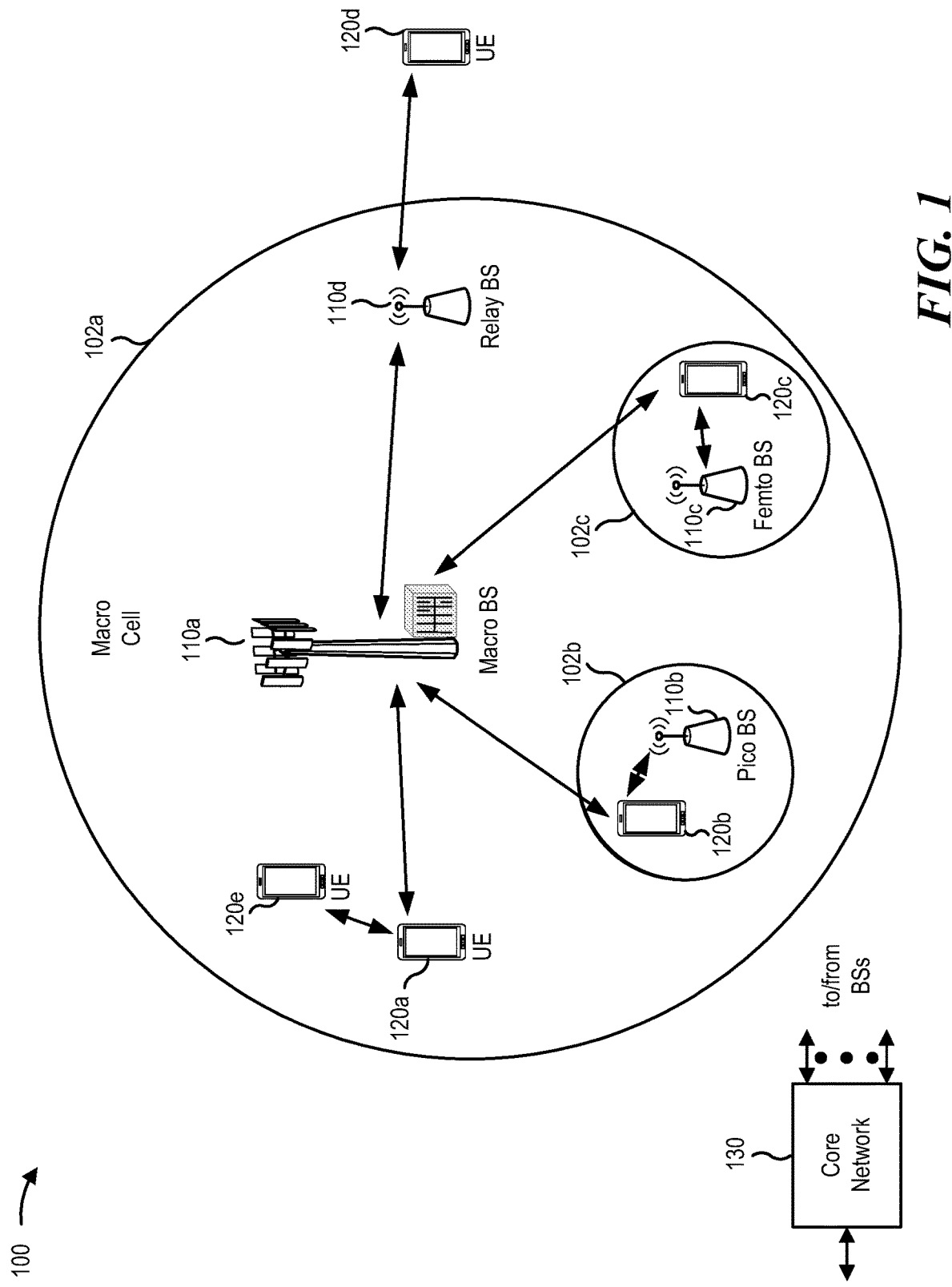
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Some machine learning approaches centralize training data on one machine, or in a data center. A federated learning model supports collaborative learning of a shared prediction model among user equipment (UEs) and a base station (or centralized server). Federated learning is a process where a group of UEs receives a machine learning model from a base station and work together to train the model. More specifically, each UE trains the model locally, and sends back either updated neural network model weights or gradient updates from, for example, a locally performed stochastic gradient descent process. The base station receives the updates from all of the UEs in the group and aggregates the updates, for example, by averaging the updates, to obtain updated global weights of the neural network. The base station sends the updated model to the UEs, and the process repeats, round after round, until a desired performance level from the global model is obtained.

Over the air (OTA) aggregation for federated learning is an attractive approach due to its low communication overhead. With OTA aggregation, each UE transmits the gradient of the weights to the network (e.g., parameter server). The network then aggregates the gradients from all of the UEs according to a function (e.g., a summation). Because wireless signals naturally add up on the uplink, it is beneficial to transmit the gradient of each parameter on the uplink as analog data for each user simultaneously. Thus, the base station (e.g., gNB) receives the sum of the gradients in the ideal scenario. However, considerations such as power control, fading compensation, phase correction, etc., need to be addressed so that the base station properly adds the gradients.

With federated learning techniques, different sets of analog gradient data may be fetched at different times. It would be desirable to introduce a framework for realizing the federated learning techniques with a new radio (NR) network. Currently, the NR network is designed to process data packets and not analog inputs from the physical layer (PHY). Aspects of the present disclosure introduce an architectural enhancement to the NR network to enable the network to compute uplink channel-based analog gradient sums. The protocol architecture includes an analog protocol stack and a digital protocol stack (also referred to as analog data communications stack and digital data communications stack, respectively). The analog protocol stack may transport analog data such as machine learning model gradients or weights.

The protocol stack includes multiple layers that communicate with each other. The layers may be software or hardware-based. Each includes a protocol stack, as does each base station. A machine learning (ML) layer is present in the protocol stacks of the UE, the base station, and the core network. The ML layer may be tasked with managing machine learning data transmission and reception needs of the network entities for transmissions to and from the base station, the UE, and the core network. An interface exists between machine learning training and inference blocks, data management and control blocks, etc. at one end of the ML layer. An interface also exists between the ML layer and the UE and base station transmission and reception stacks at the other end. The core network includes an ML layer that communicates with the ML layer of the base station to receive the gradient data.

According to aspects of the present disclosure, the ML layer may be configured to transmit the data it handles in either an analog or digital format. For analog transmission, the output of the machine learning layer to the upper MAC-A layer may be represented as a data packet. The data packet format enables lower layers to understand the data being received from the upper MAC-A layer. In some aspects, the data packet format has a main header and data fields. The main header contains at least a request ID (e.g., session ID or sequence ID), a model ID for which the gradient data was requested presented, time stamps, number of samples used for gradient computation, and other header information to enable parsing of the packet. In some aspects, a single packet is associated with the gradients for each neural network model.

According to aspects of the present disclosure, within the data fields of each data packet, the weights of the neural network may be listed in sequential order or grouped by network layer and listed in sequential order for each network layer. Each weight may be mapped to an index. Indexing for this function may be provided by a neural network description known to the upper layers. In some aspects, each gradient value is represented in binary notation in some known/standardized format. The format may be configurable, for example, when the session is initiated. The layers may be configured with different resolutions. The formats may also vary based upon weights. In some aspects, a per neural network layer number of bits is configured for gradient representation. The data fields may include a header with the neural network layer ID, followed by gradient data for that neural network layer. After the gradient data for the first layer, another header indicates the next neural network layer, followed by gradient data for this next layer.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B, an access point, a transmit and receive point (TRP), a network node, a network entity, and/or the like. A base station can be implemented as an aggregated base station, as a disaggregated base station, an integrated access and backhaul (IAB) node, a relay node, a sidelink node, etc. The base station can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A core network 130 may couple to a set of BSs and may provide coordination and control for these BSs. The core network 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrow band internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
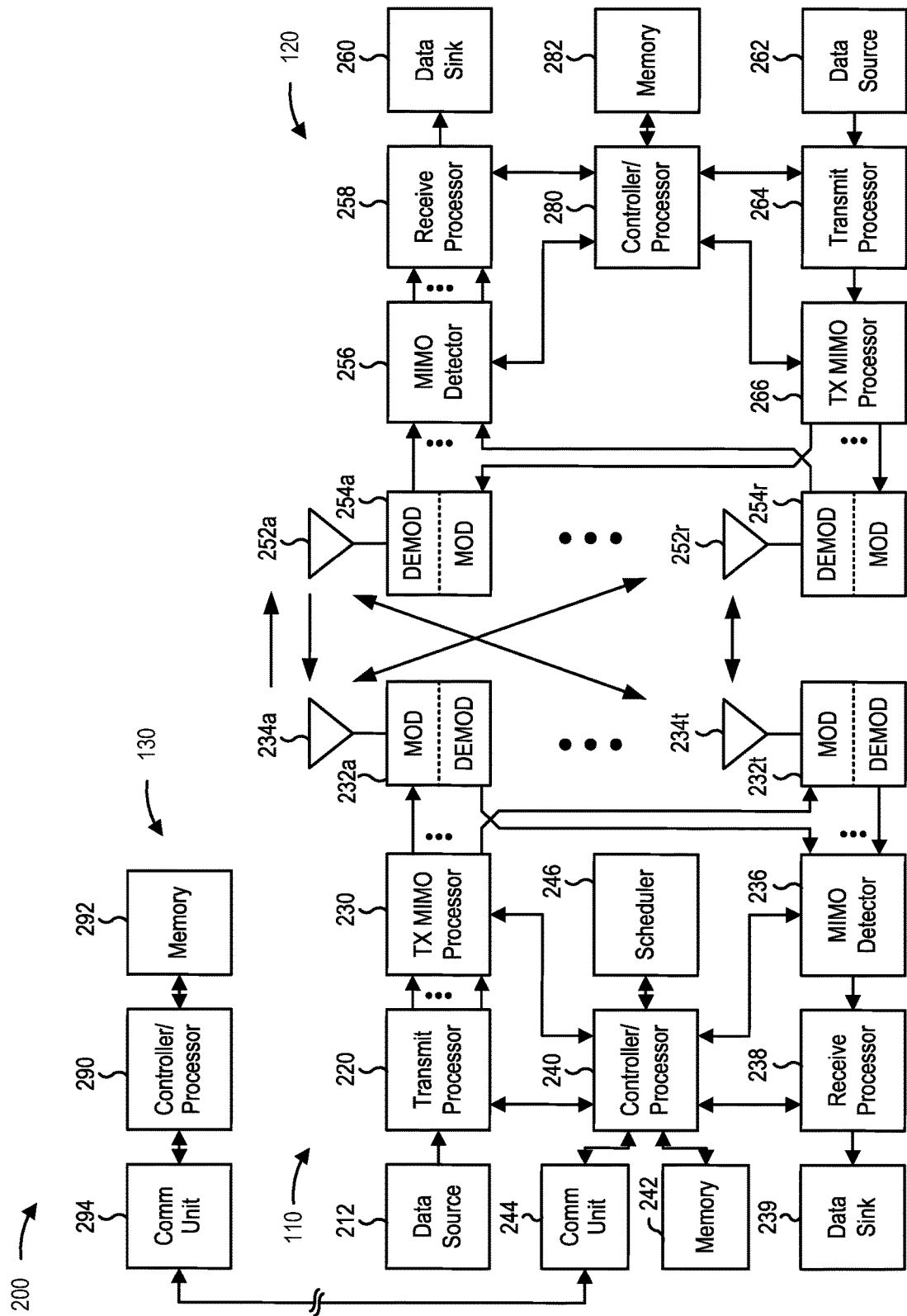
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T ≥1 and R ≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below; the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, down-convert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with upper analog media access control (MAC-A) layer functions for an analog transmission protocol stack, as described in more detail elsewhere. For example, the controller/processor 240 of the base station 110, the controller/processor 280 of the UE 120, and/or any other component(s) of FIG. 2 may perform or direct operations of, for example, the process of FIG. 17 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for generating, means for transferring, means for parsing, means for transmitting, means for analog ciphering, means for routing, and/or means for discarding. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
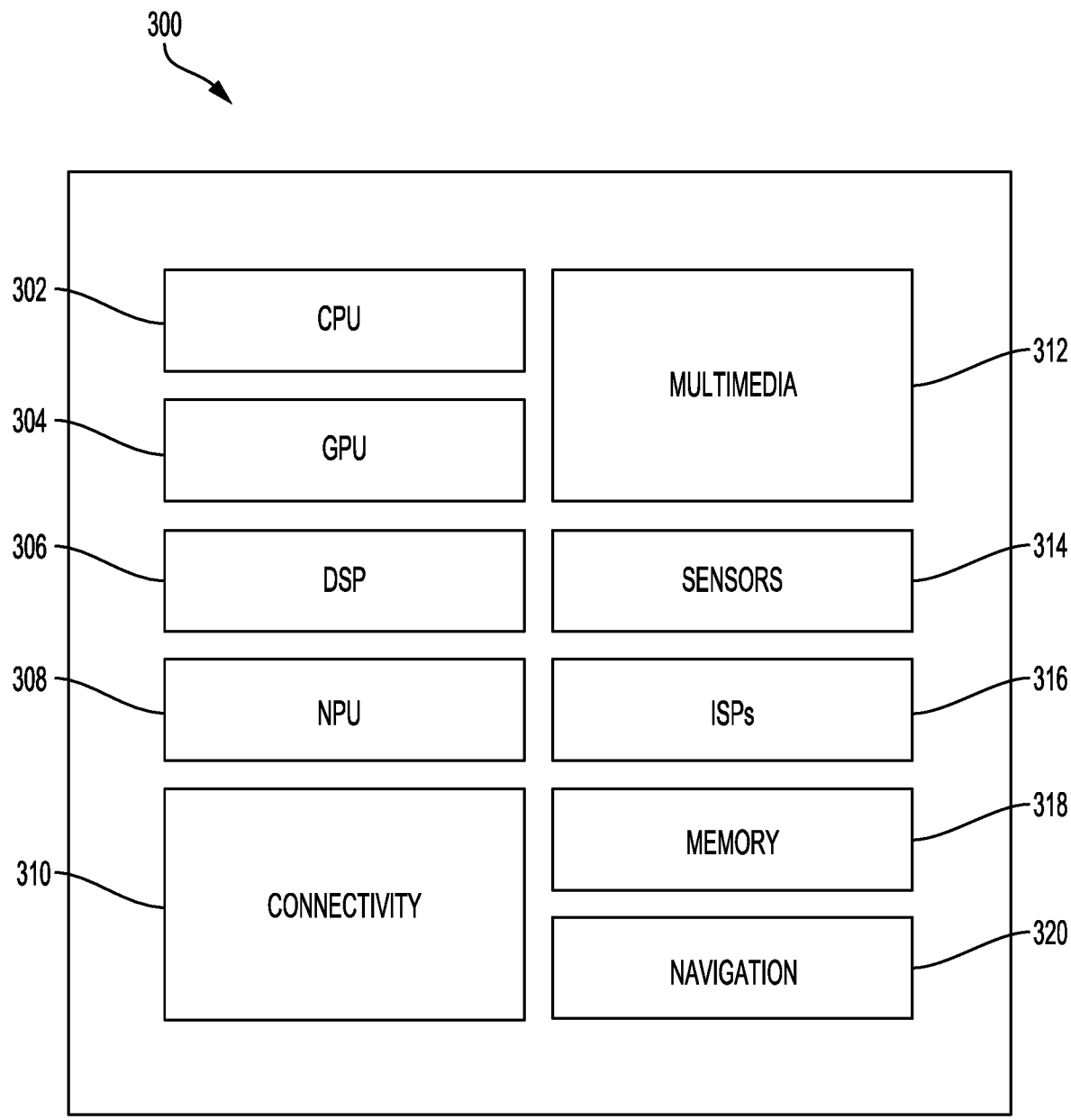
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for generating gradients for neural network training, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to generate, by an upper analog media access control (MAC-A) layer of a protocol stack, a data packet with a header and a data field, the header indicating a neural network identifier (ID) and a request ID, the data field including gradient data for a federated learning iteration. The instructions may also comprise code to transfer the data packet to lower layers of the protocol stack for transmission to a network device across a wireless network.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
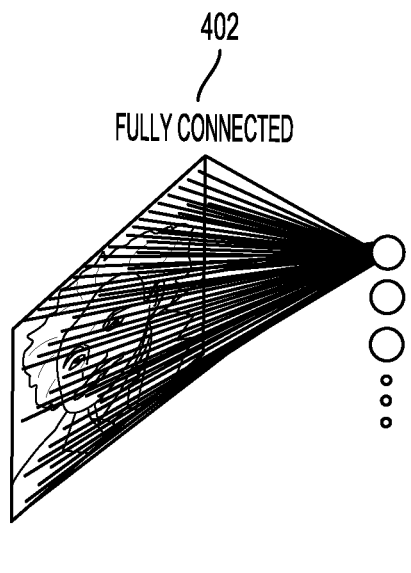
FIGS. 4A, 4B, and 4C are diagrams illustrating a neural network, in accordance with aspects of the present disclosure.
Figure 4B:
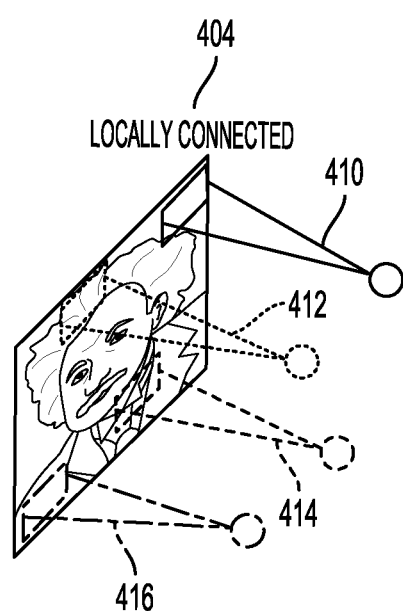

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
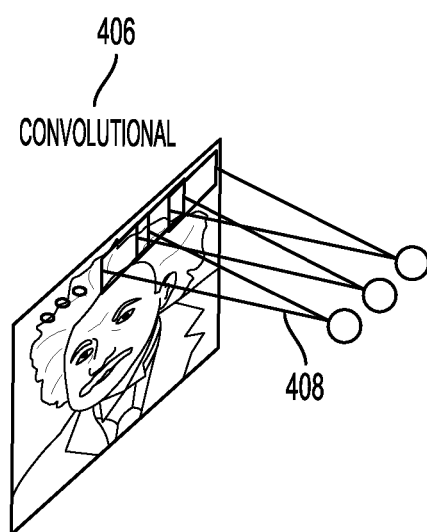

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
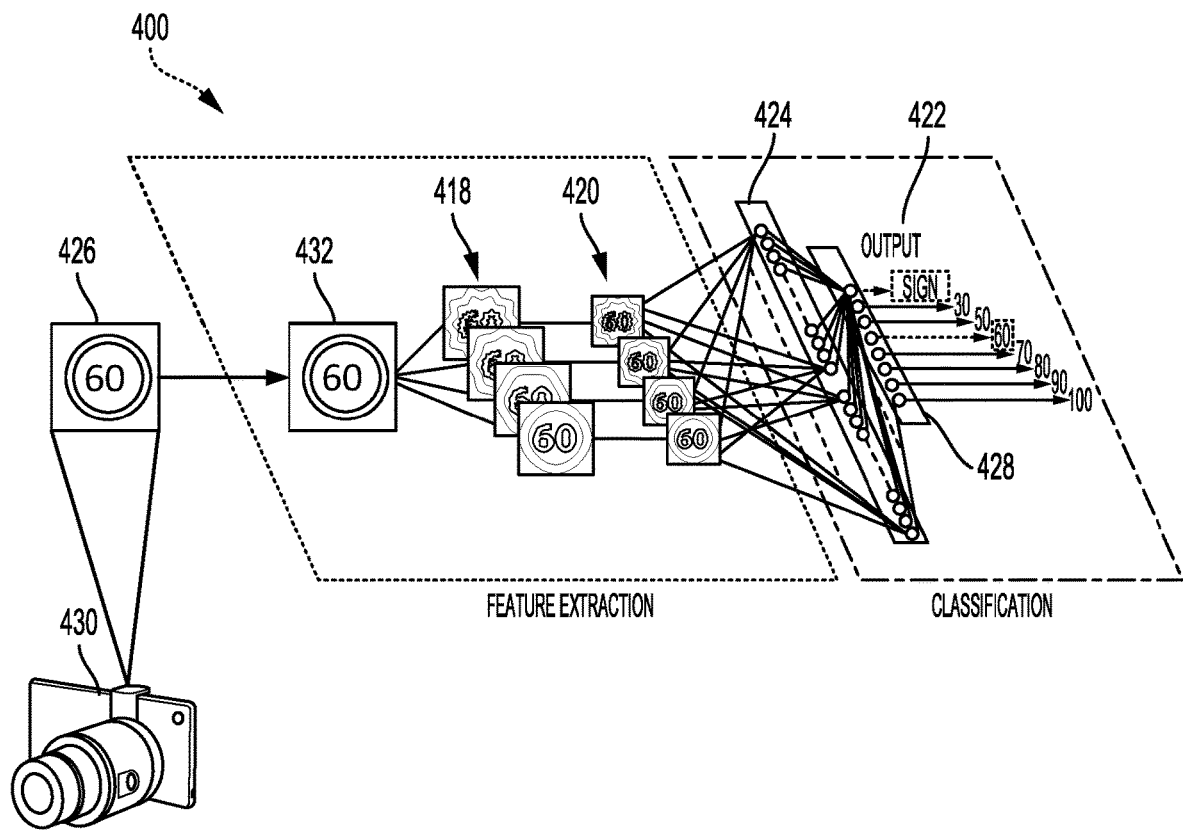
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
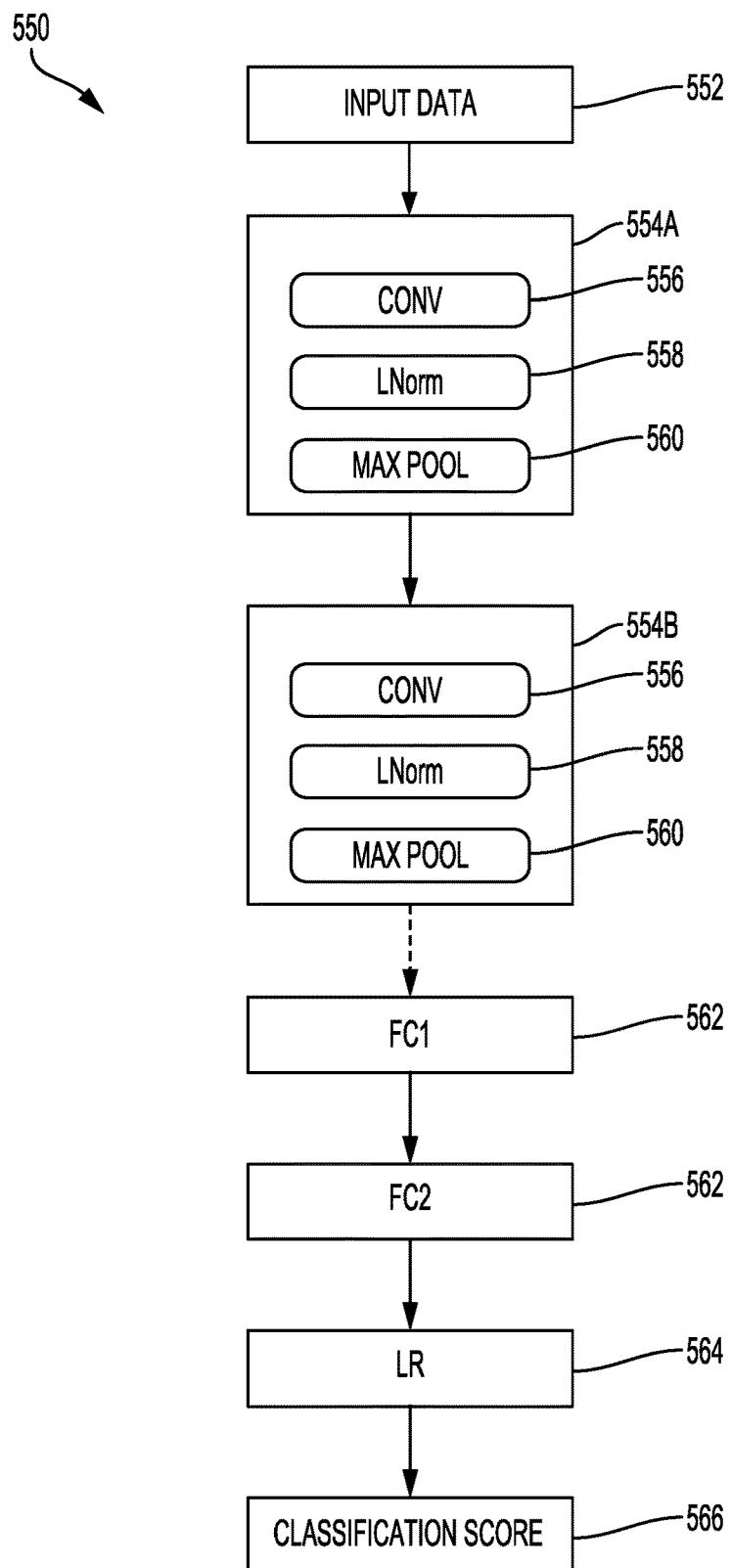
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connec- tivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

Some machine learning approaches centralize training data on one machine, or in a data center. A federated learning model supports collaborative learning of a shared prediction model among user equipment (UEs) and a base station (or centralized server). Federated learning is a process where a group of UEs receives a machine learning model from a base station and works together to train the model. More specifically, each UE trains the model locally, and sends back either updated neural network model weights or gradient updates from, for example, a locally performed stochastic gradient descent process. The base station receives the updates from all of the UEs in the group and aggregates the updates, for example, by averaging the updates, to obtain updated global weights of the neural network. The base station sends the updated model to the UEs, and the process repeats, round after round, until a desired performance level from the global model is obtained.

Over the air (OTA) aggregation for federated learning is an attractive approach due to its low communication overhead. With OTA aggregation, each UE transmits the gradient of the weights to the network (e.g., parameter server). The network then aggregates the gradients from all of the UEs according to a function (e.g., a summation). Because wireless signals naturally add up on the uplink, it is beneficial to transmit the gradient of each parameter on the uplink as analog data for each user simultaneously. Thus, the base station (e.g., gNB) receives the sum of the gradients in the ideal scenario. However, considerations such as power control, fading compensation, phase correction, etc., need to be addressed so that the base station properly adds the gradients.

Figure 6:
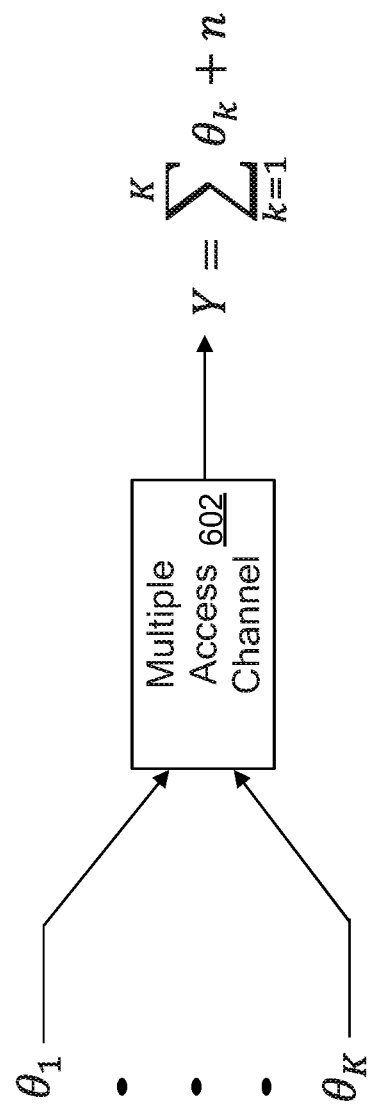
FIG. 6 is a block diagram illustrating over the air aggregation for federated learning, in accordance with aspects of the present disclosure.

FIG. 6 is a block diagram illustrating over the air aggregation for federated learning, in accordance with aspects of the present disclosure. In the example of FIG. 6, the variable Ok represents the gradient of the parameter of interest for the kth user participating in the aggregation process. A network 602 receives a gradient from each of the K users, and aggregates the gradients in accordance with a function. The network 602 may communicate with a multiple access channel, such as an orthogonal frequency-division multiple access (OFDMA) channel. In the example of FIG. 6, a summation is implemented. The overall gradient Y is a sum of each individually received gradient Ok plus some noise n. The overall gradient Y may be returned to each of the K users at the edge devices.

Figure 7:
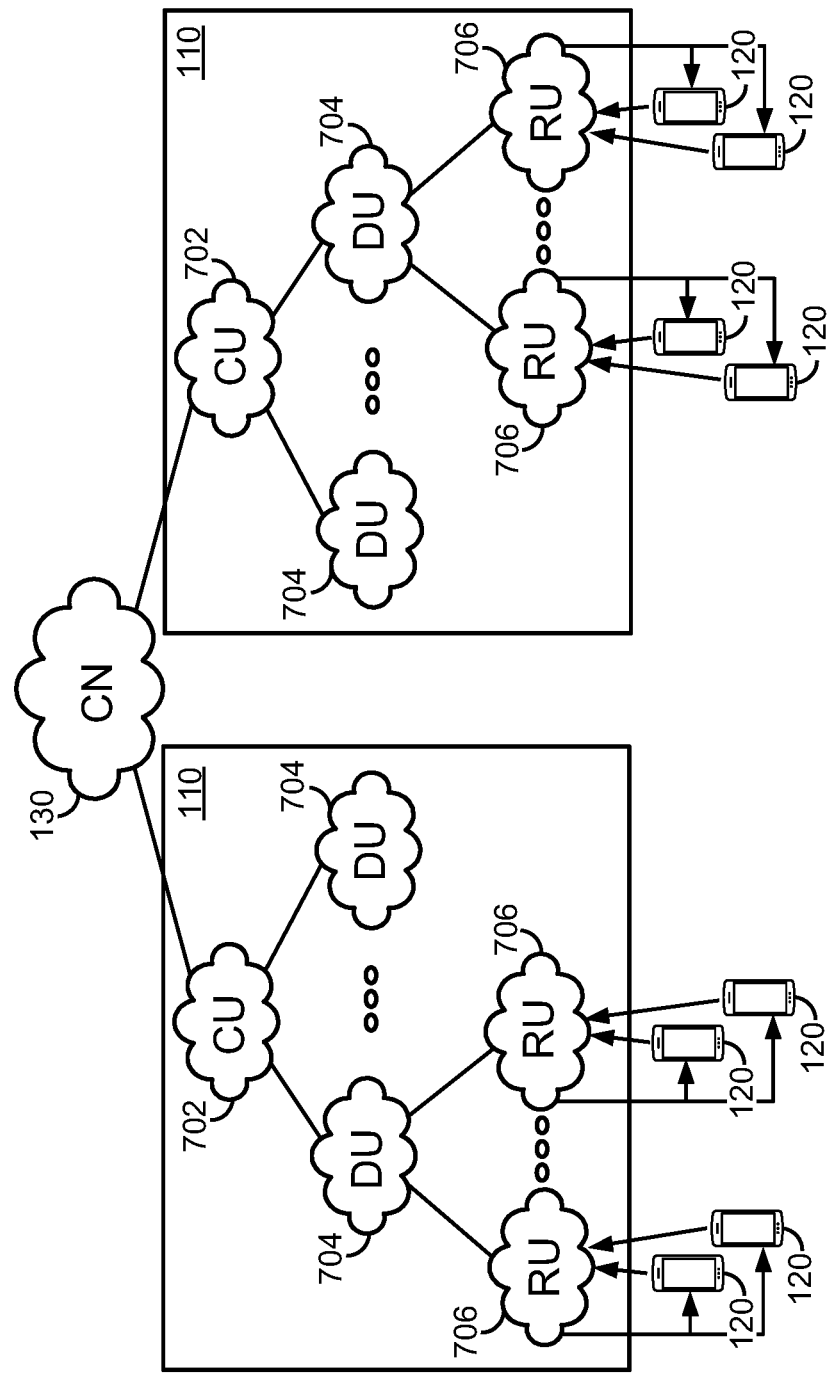
FIG. 7 is a block diagram illustrating a network architecture, in accordance with aspects of the present disclosure.

FIG. 7 is a block diagram illustrating a network architecture, in accordance with aspects of the present disclosure. In the example architecture of FIG. 7, a core network (CN) 130 communicates with base stations 110, which may be functionally split into a centralized unit (CU) 702, distributed units (DUs) 704 and radio units (RUS) 706. Each CU 702 communicates with the core network 130 via a backhaul connection. The CU 702 communicates with each of the DUs 704 via an F1 interface. The DU 704 is for managing the radio link control (RLC) layer, the media access control (MAC) layer, and parts of the physical (PHY) layer of the base station 110. The DU 704 communicates with each of the RUs 706 via a fronthaul connection, which may be an ORAN fronthaul interface (OFI). The RUs 706 of the base station 110 manage the digital front end and parts of the PHY layer for communicating wirelessly with the UEs 120. The RUs 706 each communicate with multiple UEs 120 via a physical downlink shared channel (PDSCH) and physical uplink shared channel (PUSCH), for example.

A given neural network has many weights, often millions of weights. Only a subset of weights may need to be updated in each round of a federated learning process. For example, UEs may communicate neural network weights or gradients among themselves via an over the air (OTA) link. The gradient/weight data may be aggregated at a symbol level with the OTA link. Thus, channel noise and fading are considered when sharing updates. Similarly, the RUs 706 aggregate the gradient/weight data at the symbol level, while also addressing channel noise and fading. At the DU level, aggregation occurs at the packet level. The data aggregation is coupled with the RU level because UEs 120 are scheduled by the DUs 704. At the CU level, data is aggregated at the packet level. Because the UEs 120 may be in idle mode, connected mode, or cell search mode, the CU level is coupled with the DU aggregation and the RU aggregation. The core network (CN) 130 may aggregate data received from multiple base stations 110 at the highest level. As more data becomes available, heterogeneity of the gradient/weight decreases.

Figure 8:
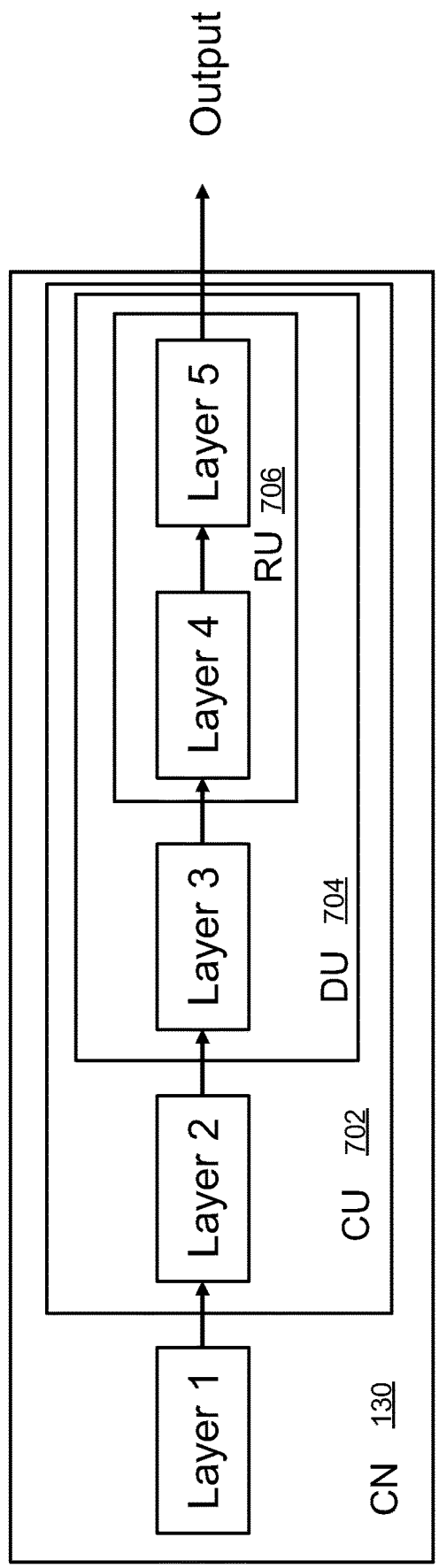
FIG. 8 is a block diagram illustrating distribution of a neural network across various network elements, in accordance with aspects of the present disclosure.

As noted above, only a subset of weights may need to be updated in each round of a federated learning process. For example, initial feature layers may be fixed while final layers may be updated. FIG. 8 is a block diagram illustrating distribution of a neural network across various network elements, in accordance with aspects of the present disclosure. The neural network has five layers in the example of FIG. 8. A first layer resides in a core network (CN) 130. A second layer resides in a centralized unit (CU) 702. A third layer resides in a distributed unit (DU) 704. Fourth and fifth layers reside in a radio unit (RU) 706. In some scenarios, weights for some of the layers may be fixed, while weights in other layers may be updated. For example, layer one may be trained for all UEs in all of the distributed units 704 (only one shown) associated with all centralized units 702 (only one shown) associated with a given core network 130. In another example, layer two is trained for all UEs of all distributed units 704 associated with a given centralized unit 702. In a third example, layer three is trained for all UEs in all radio units 706 associated with a given distributed unit 704. In a fourth example, layers four and five are trained for all UEs associated with a given radio unit 706. These weights at layers four and five may be affected by operating conditions at the base station.

In other scenarios, weights for some layers may be updated frequently, while weights for other layers may be updated at a slower rate. For example, layers four and five may be updated once every 100 ms, while layers two and three may update once every 1000 ms. In each of these scenarios, not all gradients are needed at each time occasion for updating and for network operation. The network should be able to signal which layers and weights are requested.

Figure 9:
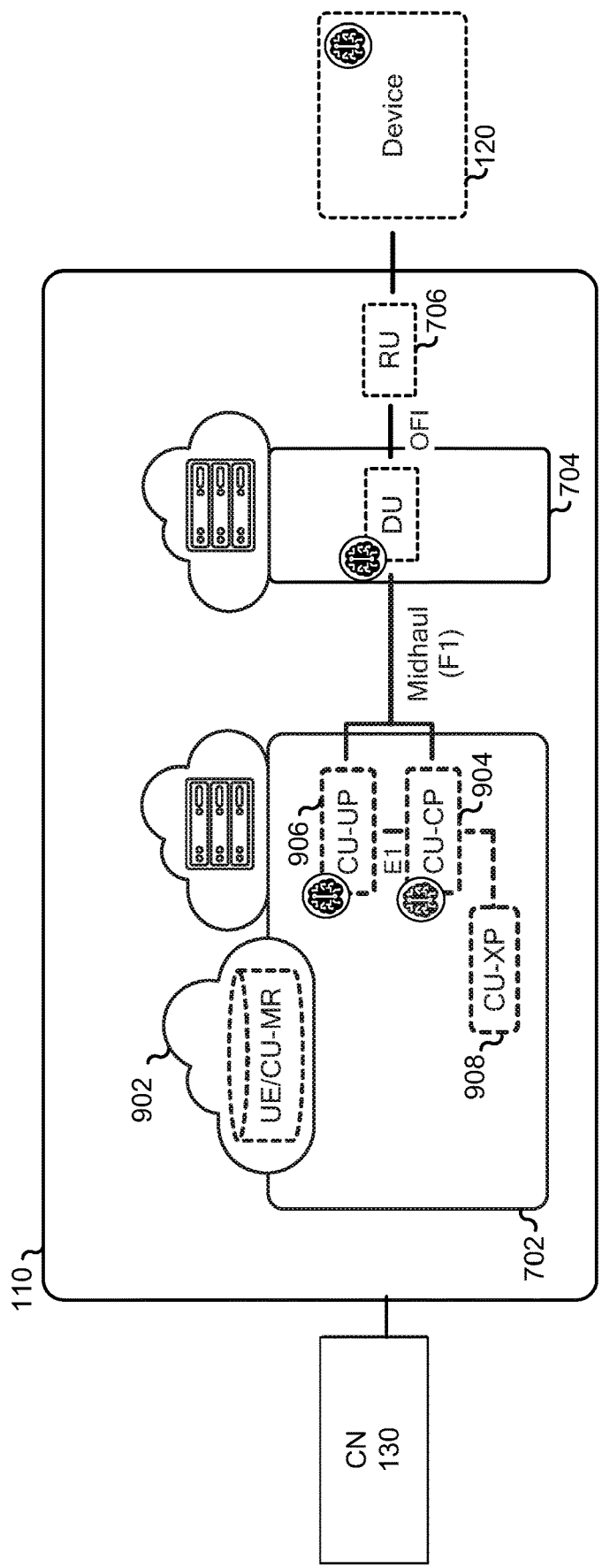
FIG. 9 is a block diagram illustrating an architecture for a network managed machine learning model of a device, in accordance with aspects of the present disclosure.

FIG. 9 is a block diagram illustrating an architecture for a network managed machine learning model of a device, in accordance with aspects of the present disclosure. The base station 110 may include a number of logical entities, such as the CU 702, at least one DU 704 (only one shown) and at least one radio unit (RU) 706 (only one shown.) The CU 702 includes a centralized unit control plane (CU-CP) 904 for managing the radio resource control (RRC) layer and packet data convergence protocol (PDCP) layer of the base station 110. The CU 702 also includes a centralized unit user plane (CU-UP) 906 for managing the user plane part of the PDCP layer and the user plane part of the service data adaptation protocol (SDAP) layer. The CU 702 further includes a centralized unit machine learning plane (CU-XP) 908 for managing machine learning functions, such as which model to select to execute a neural network function. The CU-CP 904, CU-UP 906, and CU-XP 908 communicate with each other via an E1 interface. While the CU-XP 908 is illustrated in FIG. 9 as being part of the base station 110, separate from the CU-CP 904, the CU-XP 908 may alternatively be implemented as part of the CU-CP 904 or as (a portion of) a network entity separate from the base station 110.

Various entities within the network may manage artificial intelligence (AI) or machine learning (ML) functions. For example, the CU-XP 908 may configure and manage device AI/ML network assisted functions. RAN network elements (such as the CU-CP 904, CU-UP 906, and DU 704), as well as the device itself (e.g., the UE 120), may host online inference and model training functions that are configured and managed by the CU-XP 908. A UE model repository or centralized unit model repository (UE/CU-MR) 902 may store and retrieve machine learning models for training or inference used by the UE 120 or network entities, such as the CU 702, the DU 704, or a radio access network (RAN) intelligent controller (RIC) (not shown).

As described, with federated learning techniques, different sets of analog gradient data may be fetched at different times. It would be desirable to introduce a framework for realizing the federated learning techniques with a new radio (NR) network. Currently, the NR network is designed to process data packets and not analog inputs from the physical layer (PHY). Aspects of the present disclosure introduce an architectural enhancement to the NR network to enable the network to compute uplink channel-based analog gradient sums. The protocol architecture includes an analog protocol stack and a digital protocol stack (also referred to as analog data communications stack and digital data communications stack, respectively). The analog protocol stack may transport analog data such as machine learning model gradients or weights.

Figure 10:
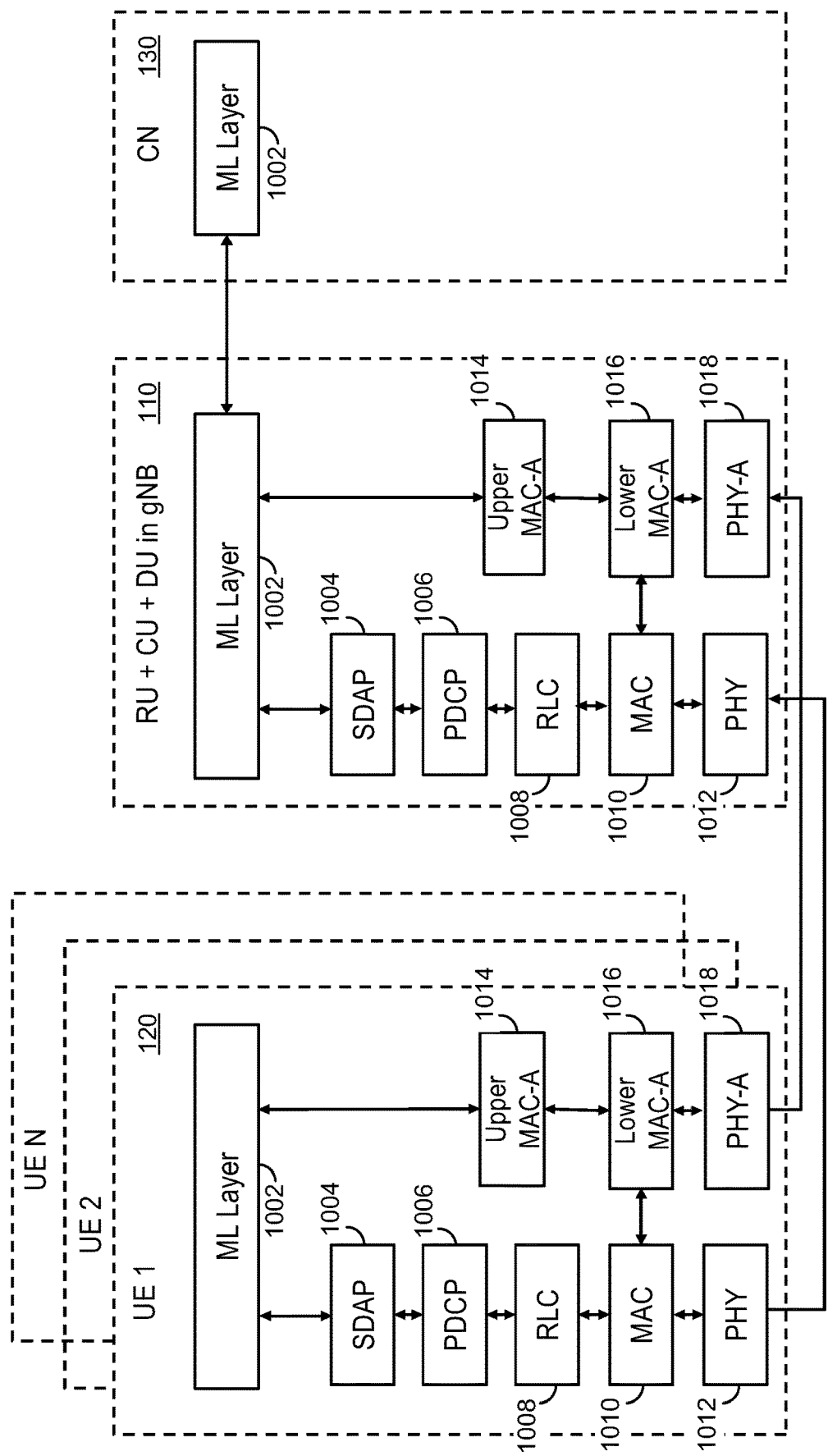
FIG. 10 is a block diagram illustrating a protocol stack for processing machine learning data, in accordance with aspects of the present disclosure.

FIG. 10 is a block diagram illustrating a protocol stack for processing machine learning data, in accordance with aspects of the present disclosure. The protocol stack includes multiple layers that communicate with each other. The layers may be software or hardware-based. Each UE 120 (e.g., UE 1 to UE N) includes a protocol stack, as does each base station 110. A machine learning (ML) layer 1002 is present in the protocol stacks of the UE 120, the base station 110, and the core network 130. The ML layer 1002 may be tasked with managing machine learning data transmission and reception needs of the network entities for transmissions to and from the base station 110, the UE 120, and the core network 130. An interface exists between machine learning training and inference blocks, data management and control blocks, etc. (not shown) at one end of the ML layer 1002. An interface also exists between the ML layer 1002 and the UE and base station transmission and reception stacks at the other end. The core network 130 includes an ML layer 1002 that communicates with the ML layer 1002 of the base station 110 to receive the gradient data.

According to aspects of the present disclosure, the ML layer 1002 may be configured to transmit the data it handles in either an analog or digital format. For the digital format, the data passes through the regular UE digital data stack, for example, a service data adaptation protocol (SDAP) layer 1004, a packet data convergence protocol (PDCP) layer 1006, a radio link control (RLC) layer 1008, a media access control (MAC) layer 1010, and a physical (PHY) layer 1012. For the analog format, the data passes through a simplified UE analog stack containing an upper analog MAC (MAC-A) layer 1014, a lower analog MAC layer 1016, and an analog physical (PHY-A) layer 1018. Although FIG. 10 show a separate UE analog stack including the upper analog MAC layer 1014, the lower analog MAC layer 1016, and the analog physical layer 1018, the functions of these layers may be performed by the regular UE data stack. For example, the functions of the upper analog MAC layer 1014 and lower analog MAC layer 1016 may be performed by the MAC layer 1010. Similarly, the functions of the analog physical layer 1018 may be performed by the physical layer 1012.

According to aspects of the present disclosure, based on either a prior configuration or a dynamic indication, the ML layer 1002 can choose to transmit data in either digital or analog format. The decision may be a packet-by-packet determination of a flow-by-flow determination. In some aspects, all control messages may be transmitted using the digital data stack. Gradient data to be transmitted for the purpose of federated learning may be transmitted in either the analog format or the digital format. If the network determines that there are a limited number of UEs communicating with a particular base station participating in the federated learning session, the network may decide it is more efficient to transmit gradient data in the digital domain. Alternatively, if the network determines that a large number of UEs are participating in the federated learning session, then the network may decide it is more efficient to transmit gradient data in the analog domain. In case the functions of the analog layers are performed by the regular UE data stack, the ML layer 1002 communicates with the regular UE digital data stack with an indication of whether the analog or digital functions should be performed either packet-by-packet or flow-by-flow.

According to aspects of the present disclosure, the upper analog MAC layer 1014 is the holding entity for the data for each neural network to/from the ML layer 1002. The upper analog MAC layer 1014 may handle some higher order functions, such as analog ciphering, bearer management, and packet management (e.g., discarding, etc.). In the analog domain, ciphering may include a sign change or multiplying by a phase, in the case of complex numbers.

According to aspects of the present disclosure, the lower MAC-A layer 1016 may perform segmentation and reassembly of analog data, mapping to the correct component carrier, handling lower layer retransmissions, etc. The lower MAC-A layer 1016 may also multiplex and de-multiplex gradient data from multiple neural networks when appropriately configured.

According to aspects of the present disclosure, the PHY-A layer 1018 may be configured to transmit and receive analog data (e.g., real and complex numbers) by taking gradient data and mapping the gradient data to real numbers. The PHY-A layer 1018 may also perform bandwidth expansion and contraction, for example, with techniques such as repetition, puncturing, interleaving, etc. The PHY-A layer 1018 may also map the data to the transmit waveform and de-map data from the receive waveform, etc. The PHY-A layer 1018 may implement the actual transmit scheme, such as mapping to the correct transmit port, using the determined beamforming and pre-equalization, maintaining phase coherence, etc.

According to further aspects of the present disclosure, radio resource control (RRC) messages may provide an overall high-level configuration for operating the upper and lower MAC-A layers 1014, 1016, and the PHY-A layer 1018. The configuration may be semi-static or long term. In some aspects, the lower MAC-A layer 1016 may receive control messages, such as media access control-control element (MAC-CE) commands, from the MAC layer 1010 in the digital stack. These MAC-CE commands may have various purposes, such as dynamic control and configuration of various lower MAC-A and PHY-A related functions.

According to still further aspects of the present disclosure, the PHY-A layer 1018 processes either an analog downlink or analog uplink shared channel (PUSCH-A and PDSCH-A). The PUSCH-A is a channel for carrying uplink gradients for federated learning. The PDSCH-A can carry gradients from the base station 110 to the UE 120, if it is determined that analog transmission in the downlink is beneficial.

As part of a federated learning process, gradients are transmitted from the UEs to the network. Some exemplary gradient transmission call flows are now described.

Figure 11:
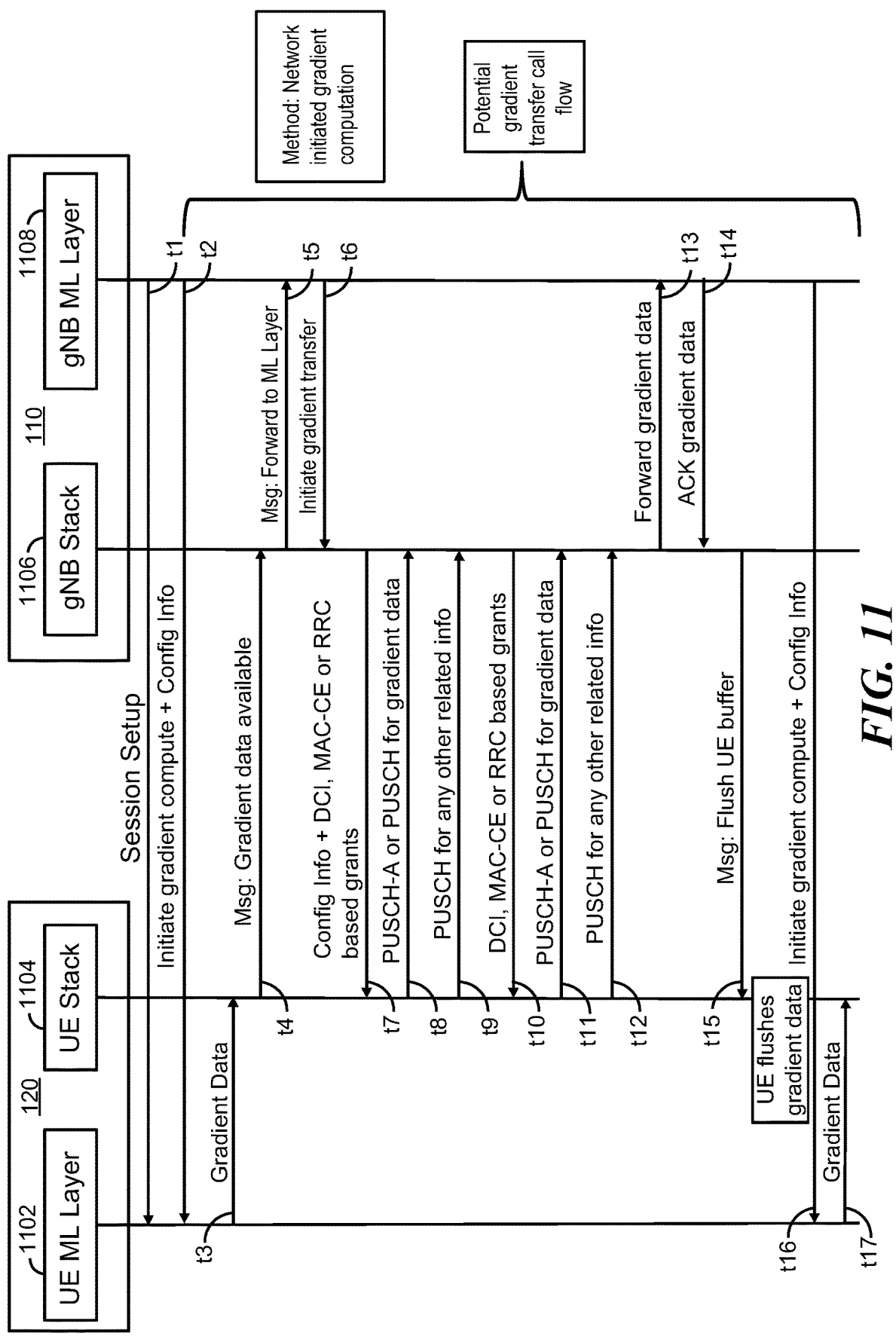
FIG. 11 is a call flow diagram illustrating network-initiated gradient transmission, in accordance with aspects of the present disclosure.

FIG. 11 is a call flow diagram illustrating network-initiated gradient transmission, in accordance with aspects of the present disclosure. In the example of FIG. 11, a machine learning layer 1102 of the UE 120 communicates with lower layers of the UE stack 1104, as well as with a machine learning (ML) layer 1108 of the base station 110 (also referred to as the gNB ML layer). The lower layers of the UE stack 1104 include the SDAP layer 1004, PDCP layer 1006, RLC layer 1008, MAC layer 1010, and PHY layer 1012 of the digital stack, and the upper MAC-A layer 1014, lower MAC-A layer 1016, and the PHY-A layer 1018 of the analog stack. Although not illustrated in the example of FIG. 11, the ML layer 1108 of the base station 110 can also include the ML layer of the core network 130. Lower layers of a base station stack 1106 (also referred to as the gNB stack) include the SDAP layer 1004, PDCP layer 1006, RLC layer 1008, MAC layer 1010, and PHY layer 1012 of the digital stack, and the upper MAC-A layer 1014, lower MAC-A layer 1016, and the PHY-A layer 1018 of the analog stack.

In the example of FIG. 11, the network (e.g., base station 110 or core network 130) initiates gradient computing at the UE 120 for each round of a federated learning process. More specifically, at time t1, the base station ML layer 1108 establishes a federated learning session with the UE ML layer 1102. At time t2, the base station ML layer 1108 transmits a message to the UE ML layer 1102 initiating gradient computation at the UE and providing configuration information. With this message, the base station 110 requests the UE 120 to collect data to start gradient computation. The message may indicate what layer of the network data is to be collected for, how much data to collect, which neural network to train, etc.

In response, the UE 120 collects data samples and computes gradients, which are transferred to the UE ML layer 1102 for storage in a buffer (e.g., at the upper MAC-A layer 1014). At time t3, the UE ML layer 1102 transmits the gradient data to the UE stack 1104 once the gradients are computed after data collection is complete. At this moment, the base station 110 is not aware of whether the gradients are ready at the UE 120. For example, different UEs may have different processing times due to different processing power, a different number of samples, etc. Thus, at time t4, the UE stack 1104 transmits a message informing the base station stack 1106 that gradient data is available at the UE 120. The base station stack 1106 forwards the message to the base station ML layer 1108 at time t5.

The base station 110 receives messages from multiple UEs 120 indicating availability of data. Once the base station 110 receives this message from all UEs 120 participating in the federated learning process, or after a threshold amount of time elapses, the base station ML layer 1108 transmits a message initiating gradient transfer at time t6. At time t7, the base station stack 1106 transmits configuration information and grants for the UE 120 to transmit the gradient data. The grants may be DCI-based, MAC-CE-based, or RRC-based. Depending on the grant size and amount of gradient data, the UE 120 may segment the data to fit into each PHY layer grant. The configuration information may also indicate whether gradients should be compressed, whether gradients should be transmitted in an analog or digital format, etc. The message may provide the physical layer resources for the gradient transmission, as well as a PHY layer coding scheme, etc. This message may not occur in this time in the call flow: The information may be sent earlier as well.

At time t8, the UE stack 1104 transfers the gradient data to the base station stack 1106 via the PUSCH-A or PUSCH depending on whether the gradient data is in the analog or digital format. At time t9, the UE stack 1104 may transmit a PUSCH message for any other related information, such as how much data has been transmitted, whether any grants have been missed, sequence numbers, etc. If additional data is expected, at time t10, the base station stack 1106 transmits additional grants to the UE stack 1104. At times t11 and t12, the UE stack 1104 transmits gradient data and any additional information via PUSCH and/or PUSCH-A messages. The steps at times t11 and t12 repeat until all gradients have been transmitted.

After the base station stack 1106 has properly received all the gradient data, the base station stack 1106 forwards the gradient data to the base station ML layer 1108 at time t13. At time t14, the base station ML layer 1108 transmits an acknowledgement (ACK) to the base station stack 1106, which forwards a message to the UE stack 1104 instructing flushing of the UE buffer storing the gradient data at time t15. Upon receiving confirmation from the network, the UE 120 can flush its buffer.

If the network determines the quality of the gradient data is inadequate or determines that more data is needed, the network may initiate a full or partial retransmission with appropriate messages to the base station stack 1106. If this is the case, at time t16, the base station ML layer 1108 transmits a message to the UE ML layer 1102 initiating gradient transfer and providing configuration information. At time t17, the UE ML layer 1102 transfers the gradient data to the UE stack 1104 and the process repeats as described with respect to times t3 to t15.

As described above, transmission of gradient data can be in an analog or digital format. In some aspects of the present disclosure, information about the format is provided at the start of the session. In other aspects, the format is determined dynamically. For example, a first transmission can be analog and any retransmissions (e.g., due to missed downlink control information (DCIs)) can be in a digital format. If the data is in a digital format, the UE ML layer or PHY layer can optionally compress the gradient data for digital transmission. A compression method may be specified in a standard or specified by configuration.

The nature of data sources used for computing gradients may vary. For example, some sources of underlying data can be regular, such as periodic or quasi-periodic, while other sources are irregular, such as event-based data. A time specified for a gradient computation may depend on a nature of the data source. In some aspects of the present disclosure, the UE informs the network when gradient data is available for a configured number of samples.

Figure 12A:
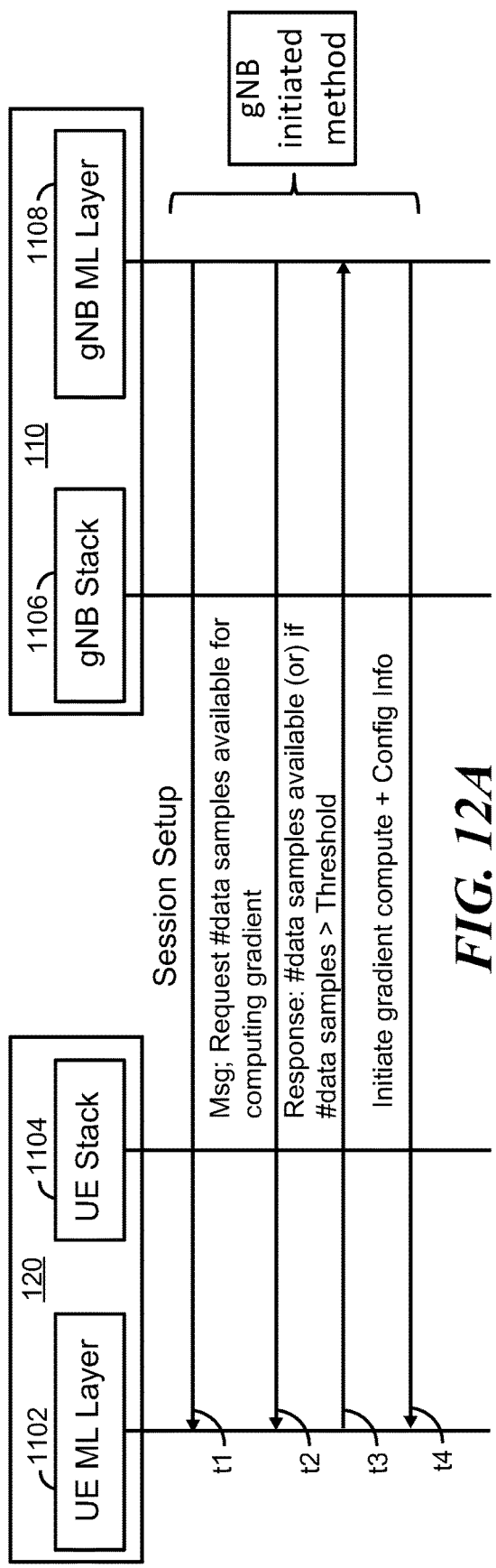
FIG. 12A is a call flow diagram illustrating network-initiated data sample availability reporting, in accordance with aspects of the present disclosure.
Figure 12B:
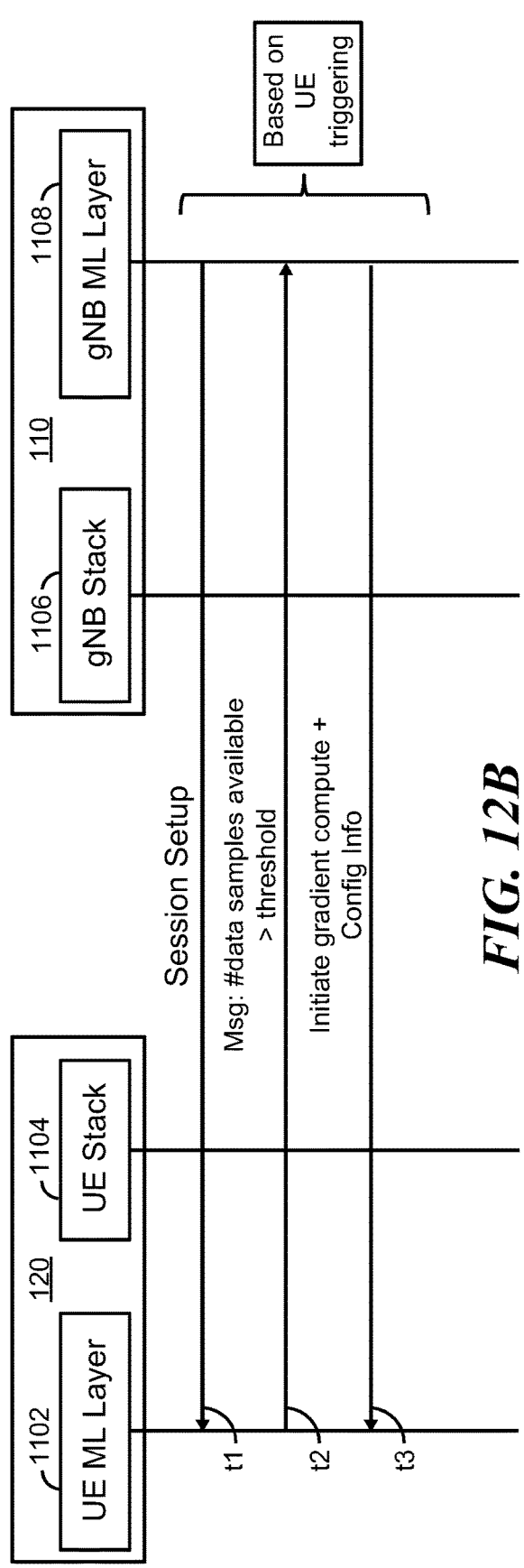
FIG. 12B is a call flow diagram illustrating user equipment (UE)-initiated data sample availability reporting, in accordance with aspects of the present disclosure.

FIG. 12A is a call flow diagram illustrating network-initiated data sample availability reporting, in accordance with aspects of the present disclosure. FIG. 12B is a call flow diagram illustrating UE-initiated data sample availability reporting, in accordance with aspects of the present disclosure. In the example of FIGS. 12A and 12B, a machine learning (ML) layer 1102 of the UE 120 communicates with lower layers of the UE stack 1104, as well as with a machine learning layer 1108 of the base station 110. The lower layers of the UE stack 1104 include the SDAP layer 1004, PDCP layer 1006, RLC layer 1008, MAC layer 1010, and PHY layer 1012 of the digital stack, and the upper MAC-A layer 1014, lower MAC-A layer 1016, and the PHY-A layer 1018 of the analog stack. Although not illustrated in the example of FIGS. 12A and 12B, the ML layer 1108 of the base station 110 can also include the ML layer of the core network 130. The lower layers of the base station stack 1106 include the SDAP layer 1004, PDCP layer 1006, RLC layer 1008, MAC layer 1010, and PHY layer 1012 of the digital stack, and the upper MAC-A layer 1014, lower MAC-A layer 1016, and the PHY-A layer 1018 of the analog stack.

In the example of FIG. 12A, the base station ML layer 1108 sets up a session with the UE ML layer 1102 at time t1. To handle a variable amount of data samples for each UE 120, in some scenarios, the base station 110 may query the UE 120 about the number of samples available and request the UE 120 to compute the gradients using the available samples if the number is larger than a threshold. For example, at time t2, the base station ML layer 1108 may transmit a message to the UE ML layer 1102 requesting the UE 120 to report the number of samples available at the UE 120 for computing gradients. In some aspects, the message may adjust the physical layer transmission parameters, such as power control, to improve OTA gradient weighting. At time t3, the UE ML layer 1102 responds to the base station ML layer 1108 with a number of data samples available or whether a number of data samples exceeds a threshold value. The threshold value may be configured at time t1 or time t2. If the base station 110 determines the number of samples is sufficient, the base station ML layer 1108 may send a message to the UE ML layer 1102 initiating gradient computation and providing configuration information at time t4. That is, in the example of FIG. 12A, the base station 110 does not wait for all samples to be collected by the UE 120. The base station 110 initiates gradient computation after a sufficient number of samples is collected.

In the example of FIG. 12B, the base station ML layer 1108 sets up a session with the UE ML layer 1102 at time t1. At time t2, the UE ML layer 1102 reports to the base station ML layer 1108 when a number of samples is greater than a threshold. If the base station 110 determines the number of samples is sufficient, the base station ML layer 1108 may send a message to the UE ML layer 1102 initiating gradient computation and providing configuration information at time t3.

Figure 13:
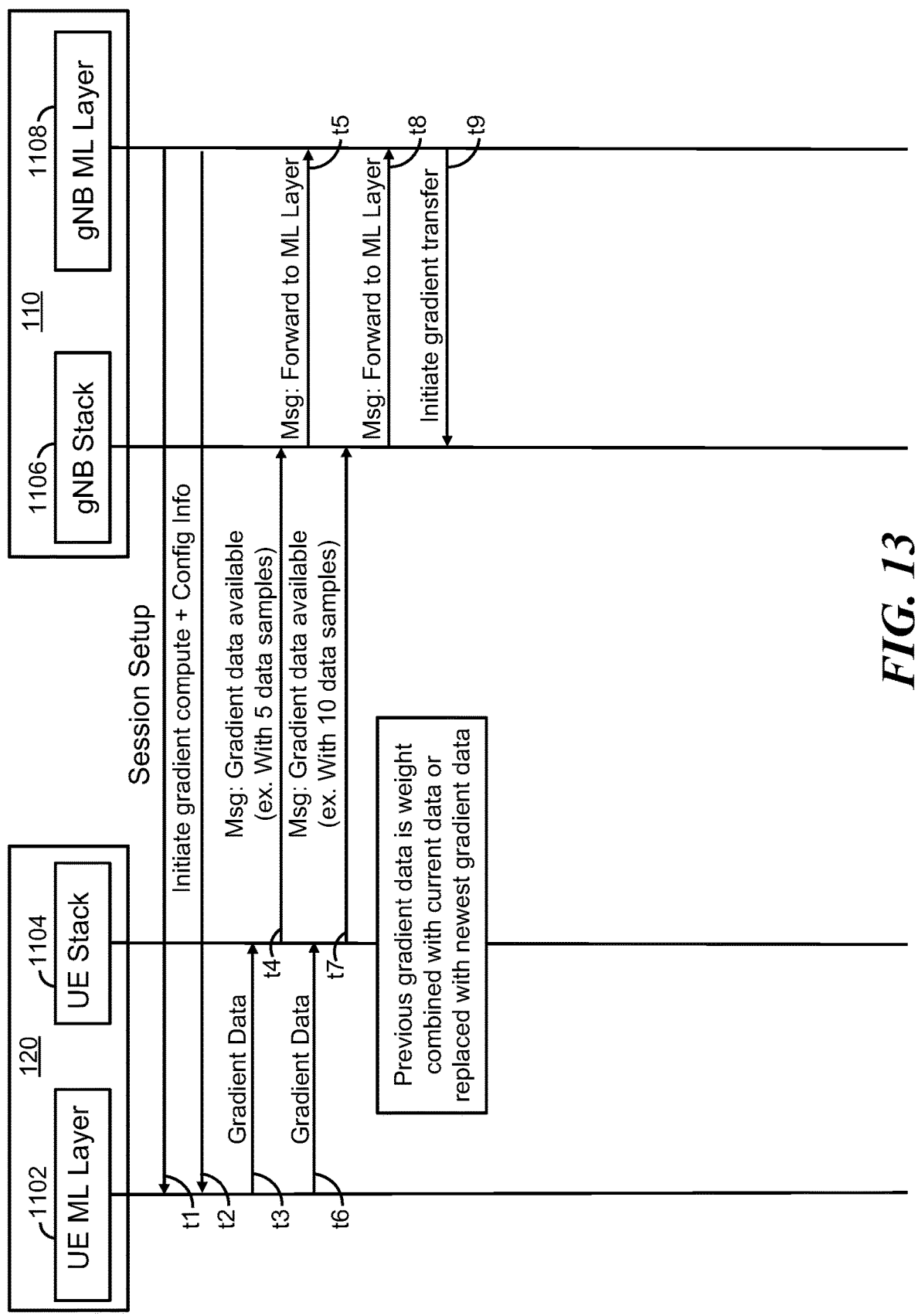
FIG. 13 is a call flow diagram illustrating continuous gradient computing at a user equipment (UE), in accordance with aspects of the present disclosure.

FIG. 13 is a call flow diagram illustrating continuous gradient computing at a UE, in accordance with aspects of the present disclosure. In the example of FIG. 13, the base station 110 may fetch gradient data when needed. At time t1, a base station ML layer 1108 establishes a federated learning session with a UE ML layer 1102. At time t2, the base station ML layer 1108 transmits a message to the UE ML layer 1102 initiating gradient computation at the UE and providing configuration information. With this message, the base station 110 requests the UE 120 to collect data to start gradient computation. The message may indicate what layer of the network data is to be collected for, how much data to collect, which neural network to train, etc.

In response, the UE 120 collects data samples and computes gradients, which are transferred to the UE ML layer 1102. At time t3, the UE ML layer 1102 transmits the gradient data to a UE stack 1104. At time t4, the UE stack 1104 transmits a message informing a base station stack 1106 that gradient data is available at the UE 120. In this example, five data samples are available at time t4. The base station stack 1106 forwards the message to the base station ML layer 1108 at time t5. The process repeats after the UE 120 performs another round of computation. That is, at time t6, the UE ML layer 1102 transmits the gradient data to the UE stack 1104. At time t7, the UE stack 1104 transmits a message informing the base station stack 1106 that gradient data is available at the UE 120. In this example, ten data samples are available at time t7. The base station stack 1106 forwards the message to the base station ML layer 1108 at time t8.

Once the base station 110 receives the message from all UEs 120 participating in the federated learning process, or after a threshold amount of time elapses, the base station ML layer 1108 transmits a message to the base station stack 1106 initiating gradient transfer at time t9. In the example of FIG. 13, the base station 110 may fetch the gradient when needed. In some aspects, the gradient data indicated as available at time t7 is weight combined, for example, averaged, with the gradient data available at time t4. In other aspects, the gradient data available at time t7 replaces the gradient data available at time t4.

Figure 14:
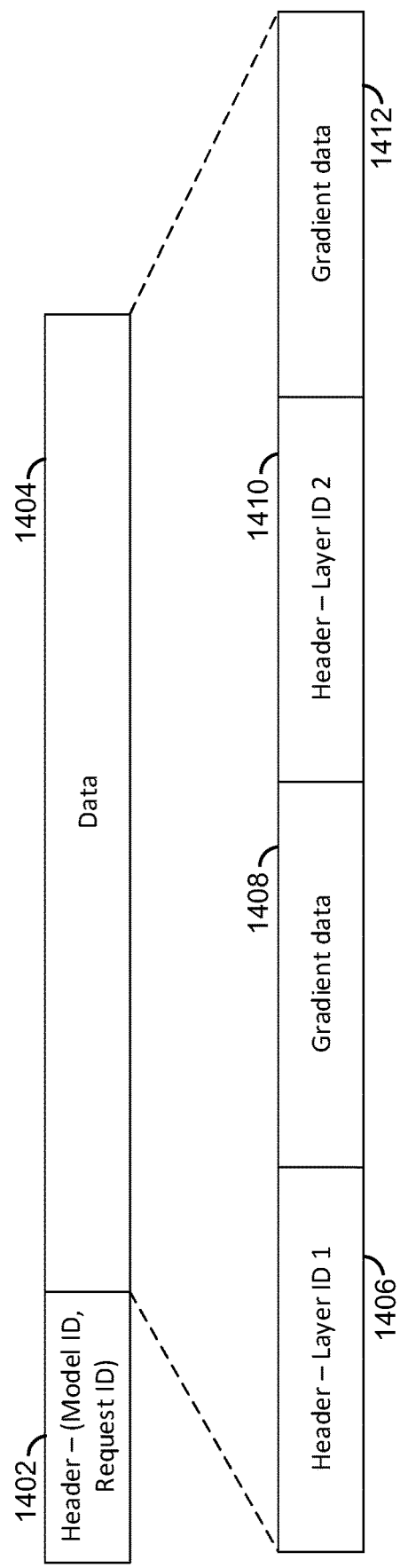
FIG. 14 is a block diagram illustrating a data packet format for gradient transmissions, in accordance with aspects of the present disclosure.

More detail of each of the layers of the analog protocol stack will now be presented. For analog transmission, the output of the machine learning layer to the upper MAC-A layer may be represented as a data packet. FIG. 14 is a block diagram illustrating a data packet format for gradient transmissions, in accordance with aspects of the present disclosure. The data packet format enables lower layers to understand the data being received from the upper MAC-A layer. In the example of FIG. 14, the data packet format has a main header 1402 and data fields 1404. The main header 1402 contains at least a request ID (e.g., session ID or sequence ID), a model ID for which the gradient data was requested presented, time stamps, number of samples used for gradient computation, and other header information to enable parsing of the packet. In some aspects, a single packet is associated with the gradients for each neural network model.

According to aspects of the present disclosure, within the data fields 1404 of each data packet, the weights of the neural network may be listed in sequential order or grouped by network layer and listed in sequential order for each network layer. Each weight may be mapped to an index. Indexing for this function may be provided by a neural network description known to the upper layers. In some aspects, each gradient value is represented in binary notation in some known/standardized format (e.g., IEEE floating point, with a specified number of bits). The format may be configurable, for example, when the session is initiated. The layers may be configured with different resolutions. For example, some layers may specify a 16-bit format whereas other layers may specify a 12-bit format or eight-bit format. The formats may also vary based upon weights. In some aspects, a per neural network layer number of bits is configured for gradient representation. Referring back to FIG. 14, the data fields 1404 may include a header 1406 with the neural network layer ID, followed by gradient data 1408 for that neural network layer. After the gradient data 1408 for the first layer, another header 1410 indicates the next neural network layer, followed by gradient data 1412 for this next layer.

The base station may request a specific set of gradients for a PUSCH-A transmission. The request may include starting and ending neural network weight indices. According to some aspects of the present disclosure, the lower MAC-A and PHY-A (lower layers in general) are aware of the packet structure and can parse the packet received from the upper layer. Thus, the requested gradients may be extracted and encoded properly for transmission. This behavior is the opposite of the digital stack, where the lower layer cannot parse the contents of the upper layer packet. For example, the MAC layer cannot parse an RLC packet and the RLC layer cannot parse a PDCP, etc.

For the final transmission from the PHY-A layer, only the gradients are transmitted. The headers 1402, 1406, 1410 are dropped. The headers 1402, 1406, 1410 are provided for parsing and selecting the correct set of weights. Headers are useful because there may be a neural network specific or neural network layer specific encoding to be performed. For example, some neural network layers can be transmitted with more repetition but others with less, as the weights of some layers may be of higher importance.

Functions of the upper MAC-A layer may include analog ciphering. For real data, each gradient may have its sign updated based on a cipher output. The same ciphering should be implemented for all UEs so the gradient data can be deciphered at the base station correctly.

Functions of the upper MAC-A layer may include bearer management. In some aspects, bearers may be managed by routing packets to different carriers or cell groups (e.g., a master cell group (MCG) or secondary cell group (SCG)). In other aspects, the upper MAC-A layer manages bearers by splitting packets within a bearer (e.g., a split bearer). Bearers may be split on a per neural network layer basis. For example, neural network layer one packets transmit to the MCG, and neural network layer two packets may transmit to the SCG, etc.

The upper MAC-A layer may also perform packet acknowledgement and packet discarding. The upper MAC-A layer stores the packets. If the base station acknowledges receipt of the gradients and/or instructs the UE to flush the gradient data, then the UE can flush the packet in the upper MAC-A. Alternatively, a timer-based discard can be implemented. For example, if data is older than some amount of network configured time (e.g., ten seconds) the data is too old and will be discarded. If multiple gradient data packets are available for the same neural network, the upper MAC-A layer may implement sequence numbering so the base station can receive the correct gradient data. For example, the first gradient may be transmitted as packet one, the second gradient as packet two, etc.

The upper MAC-A layer may manage status reports. Status reports may be sent to the base station via the digital data stack. Status may include availability or unavailability of gradient data from machine learning layers, for example.

The lower MAC-A layer will now be discussed. A number of requested gradients may be in the millions for large models. If one parameter (or two in case of complex transmission) is mapped onto one orthogonal frequency division multiplexing (OFDM) subcarrier, it would take many PHY slots to transmit the gradients for just one layer. For example, for a 100 MHz bandwidth and 14 symbols in frequency range one (FR1), the UE can transmit 3264*14 ~45,000 parameters in one full slot. This suggests that the MAC layer needs to perform segmentation and reassembly of gradient data, even within a layer when the number of gradients for each neural network layer is large. In the opposite scenario, the MAC layer can multiplex the data from multiple neural network layers to match the PHY layer allocated resources.

According to aspects of the present disclosure, the lower MAC-A layer performs segmentation and reassembly of data. Based on a resource allocation received and a PHY layer coding scheme implemented, the MAC-A layer may segment the packet to select the appropriate number of gradients for transmitting. For example, in a slot n, the scheduler allocates a set of $N_{tones} \cdot N_{symbols}$ in a slot. The PHY layer coding scheme may include repetition, repetition plus sign/phase change, padding, puncturing, repetition plus interleaving, etc. Extra tones may be allocated in each symbol to embed symbols and reduce peak-to-average power ratio (PAPR). Based on all these considerations, the lower MAC-A layer determines $N_{grad}$ values to transmit in the allocated grant. A grant may also include a starting gradient index and the $N_{grad}$ value.

According to further aspects of the disclosure, the network may transmit grants, or reserve resources and activate them, using MAC-CEs. Each MAC-CE may contain all information needed to transmit by the PHY-A layer. For example, the MAC-CE may include the slot ID, neural network (NN) ID, layer and weight indices, PHY-A layer encoding scheme, resource allocation, analog or digital (re)-transmission, etc. In some configurations, all contents of the DCI may be sent in the MAC-CE. The transmission may be sequential or may be an indication-based transmission of gradients. The MAC-CE may be transmitted on the digital stack on the PDSCH. As a result, the network receives an acknowledgement (ACK) when the UE receives the MAC-CE. On the other hand, if DCI was used, no ACK would be sent. If the UE misses the PDSCH containing the MAC-CE, the network will not receive an ACK and may reschedule the PDSCH, improving reliability. If the network indicates digital transmission, then the packet is encoded by the MAC layer and transmitted over the regular PUSCH. When the gradients are transmitted as analog data, no hybrid automatic repeat request (HARQ) processing occurs. However, retransmissions may be requested.

According to still further aspects, if multiple neural network models are updated simultaneously, then the data from each model is kept distinct. Each set of neural network model parameters may be stored in separate upper MAC-A layer buffers. In some configurations, gradients from multiple neural networks may be multiplexed into a single transmission, when appropriately configured.

According to aspects of the present disclosure, the lower MAC-A layer transmits buffer status reports, as opposed to an upper layer status report. For example, if the upper UE layers indicate data is not ready, then this status may be sent to the base station in a MAC-CE. The MAC-CE may carry the identity of the requesting message and possibly a reason why data is not available. The MAC-CE is a digital message and is not transmitted on the PUSCH-A.

According to further aspects of the present disclosure, the lower MAC-A layer performs power headroom reporting. The power headroom reports allow the base station to group UEs dynamically and adjust a set of existing grouped UEs, if needed. A new power headroom report for analog data (PHR-A) is introduced. The conventional PHR is derived assuming a reference PUSCH transmission over M resource blocks (RBs) (where M=1). In some configurations, the PHR-A report may be derived using a mean transmit power of the last N analog transmissions. In other configurations, the UE may construct a potential PUSCH transmission of N future slots assuming a reference number of resource blocks for each slot. The UE then computes the average power required to transmit them. This value is indicated in the PHR-A. A distribution of the gradient data should be specified so that the UE can derive samples to be transmitted on each symbol and then compute the peak-to-average power ratio (PAPR), compute the mean transmit power and backoff needed, and then derive the PHR-A.

The PHY-A layer will now be described. The downlink (DL) PHY-A layer at the UE receives a DCI grant (e.g., a group grant) from the base station and sends information to the MAC-A layers to receive a set of weights to be transmitted. The PHY-A layer may receive a downlink-analog modulation reference signal (DL-AMRS) spanning all resources used for uplink transmission. Based on the DL-AMRS, the PHY-A layer may compute a path loss, a channel for pre-equalization/pre-processing, phase correction, timing correction, etc., needed for uplink transmission. Alternatively, path loss may be derived from other reference signals, such as a synchronization signal block (SSB)/channel state information-reference signal (CSI-RS) and applied with a correction factor.

Uplink PHY-A functions at the UE include receiving parameters from the MAC-A layers and implementing coding, interleaving, etc., within a slot. The uplink PHY-A layer creates a real/complex number from the parameters and maps the real/complex numbers onto OFDM symbols and subcarriers. The uplink (UL) PHY-A layer also implements power control, pre-equalization, phase correction, timing correction, etc. The UE may implement additional gradient scaling (e.g., as indicated by the grant or as indicated by a number of samples used by upper layers in the header). The UE may then transmit the time domain waveform. The UE may also transmit an UL-AMRS to enable the base station to determine whether a given UE is transmitting. In some aspects, the base station may transmit a new DL-AMRS for pre-equalization every time a phase change occurs at the UE, such as with a downlink/uplink switch or bandwidth part (BWP) retuning, etc.

According to aspects of the present disclosure, an uplink grant may be received in downlink control information (DCI) information elements, similar to information elements for the MAC-CE-based grants. A first example DCI format includes a neural network model ID, a layer ID, a weights starting index, and a number of weights, which enables per layer addressing of weights. A second example DCI format includes a neural network model ID, a weights starting index, and a number of weights, which enables global addressing of weights across layers. Additional information may include a BWP ID, a cell ID, time and frequency resources, a value for a k2 (delay) parameter, scaling/power control values, AMRS configuration parameters, sounding reference signal (SRS) configuration parameters, interleaving information, a port ID, etc. The k2 delay parameter indicates a delay between a slot N during which a grant is received and a slot N+k2 for transmitting the gradients. A list of weights for each layer may be provided by the upper layers at the time of federated learning configuration.

The PHY-A layer may also process downlink grant reception. According to aspects of the present disclosure, a group DCI format may be defined with a new radio network temporary identifier (RNTI). A payload size may be determined by upper layer configuration based on a number of fields and a size of each field. The downlink grant may map to an existing search space or a newly defined search space. Upon receiving the physical downlink control channel (PDCCH), the UE may be configured to transmit an ACK to the base station. Parameters for this ACK may be configured by RRC signaling. The ACK may be transmitted on a physical uplink control channel (PUCCH) or multiplexed with another UCI message on the PUSCH. The ACK informs the base station of whether the UE received the PDCCH. The UE may not transmit for other reasons, such as a handover started, insufficient transmit power, etc., however, the base station knows the downlink grant has been received by the UE. An individual grant with the same DCI format (e.g., with a different RNTI or using a cell RNTI (C-RNTI)) may also be defined. Thus, the base station may request the UE to transmit individually, as well.

According to further aspects of the present disclosure, MAC-CE or RRC-based transmission triggering may provide another type of grant. In these aspects, a same grant payload may be transmitted in a MAC-CE or by an RRC message on a PDSCH or a multi-cast PDSCH for multiple UEs. These aspects allow for more complex grants with multiple repetitions, as well as requests for multiple layers bundled into the same message.

According to further aspects of the present disclosure, an RRC configuration may describe details of each scheme, such as coding, pre-equalization, etc.

In other aspects, an antenna port used to receive the DL-AMRS and transmit the uplink gradients is the same. Thus, the channel estimated on the downlink for pre-equalization is the same as the channel experienced by the uplink transmission.

The PHY-A layer may implement robustness schemes to improve reliability of transmissions of the analog data. For example, the PHY-A layer may communicate with time/frequency/spatial diversity for analog transmission. More robustness schemes are applicable to MIMO scenarios. These schemes may include cyclic delay diversity (CDD), beamforming, etc.

Figure 15:
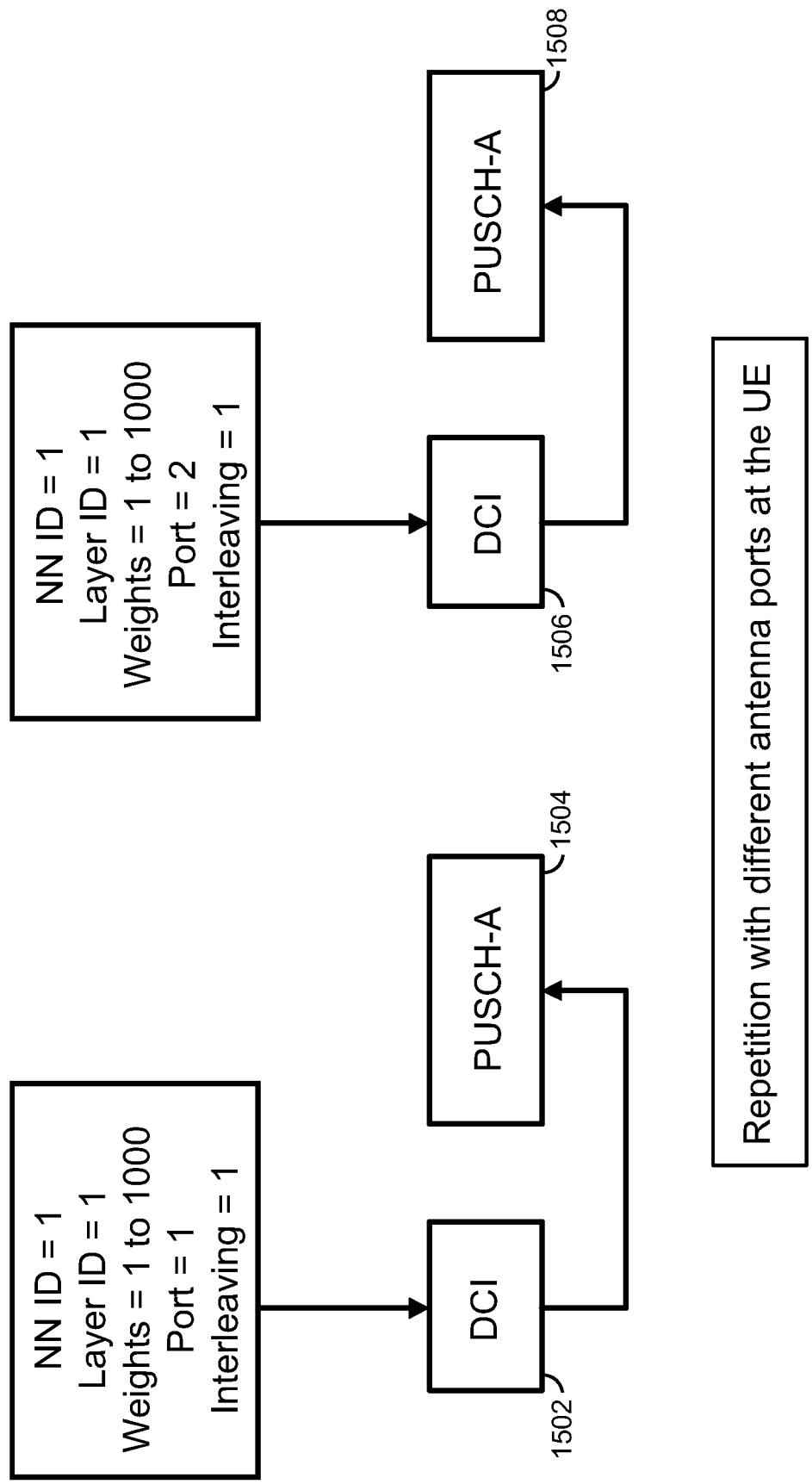
FIG. 15 is a block diagram illustrating PHY layer repetition with different antenna ports, in accordance with aspects of the present disclosure.

FIG. 15 is a block diagram illustrating PHY layer repetition with different antenna ports, in accordance with aspects of the present disclosure. In the example of FIG. 15, a first DCI message 1502 provides a grant for a first PUSCH-A 1504 in a single input, single output (SISO) scenario. The first grant is for the first one thousand weights of layer one of neural network (NN) one. The first grant indicates port one for transmitting with interleaving type one. A second DCI message 1506 provides a grant for a second PUSCH-A 1508. The second grant is also for the first one thousand weights of layer one of neural network (NN) one. The second grant indicates port two for transmitting with interleaving type one. This scheme of varying the port for transmitting the same data may be referred to as repetition coding, as the PUSCH-A is transmitted on orthogonal resources on both occasions.

Figure 16:
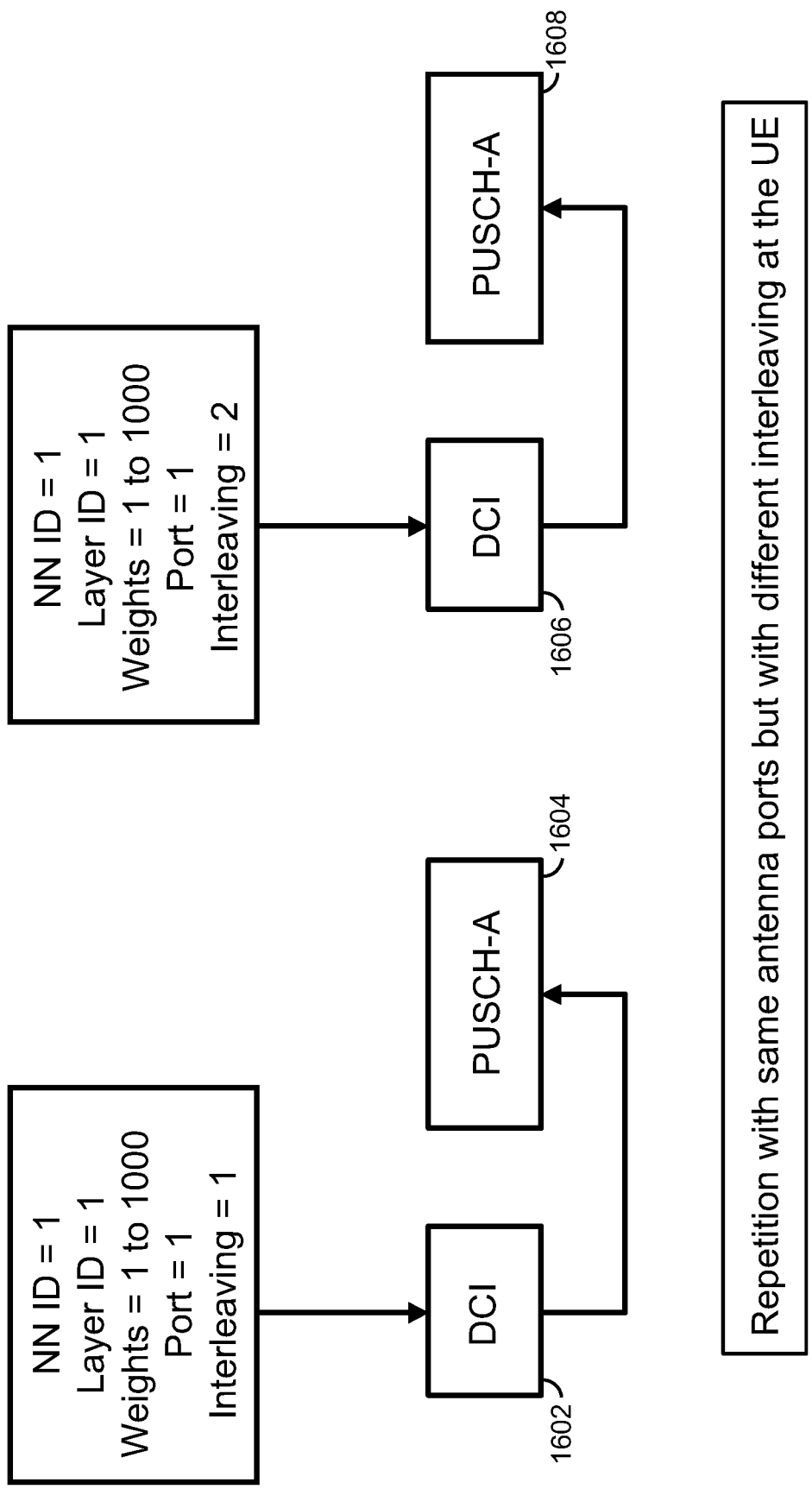
FIG. 16 is a block diagram illustrating PHY layer repetition with different interleaving, in accordance with aspects of the present disclosure.

FIG. 16 is a block diagram illustrating PHY layer repetition with different interleaving, in accordance with aspects of the present disclosure. In the example of FIG. 16, a first DCI message 1602 provides a grant for a first PUSCH-A 1604 in a single input, single output (SISO) scenario. The first grant is for the first one thousand weights of layer one of neural network (NN) one. The first grant indicates port one for transmitting with interleaving type one. A second DCI message 1606 provides a grant for a second PUSCH-A 1608. The second grant is also for the first one thousand weights of layer one of neural network (NN) one. The second grant indicates port one for transmitting with interleaving type two. This scheme of varying the interleaving technique for transmitting the same data may also be referred to as repetition coding, as the PUSCH-A is transmitted on orthogonal resources on both occasions.

Although the present disclosure has been described with respect to federated learning, the disclosure is not so limited. For example, the described techniques may have applicability in amplify and forward relays, smart repeaters, smart reconfigurable intelligent surfaces (RIS), etc., where it is also beneficial to support analog transmission schemes. Moreover, although gradients have been described, the present disclosure also contemplates sharing weights instead of or in addition to the gradients.

Figure 17:
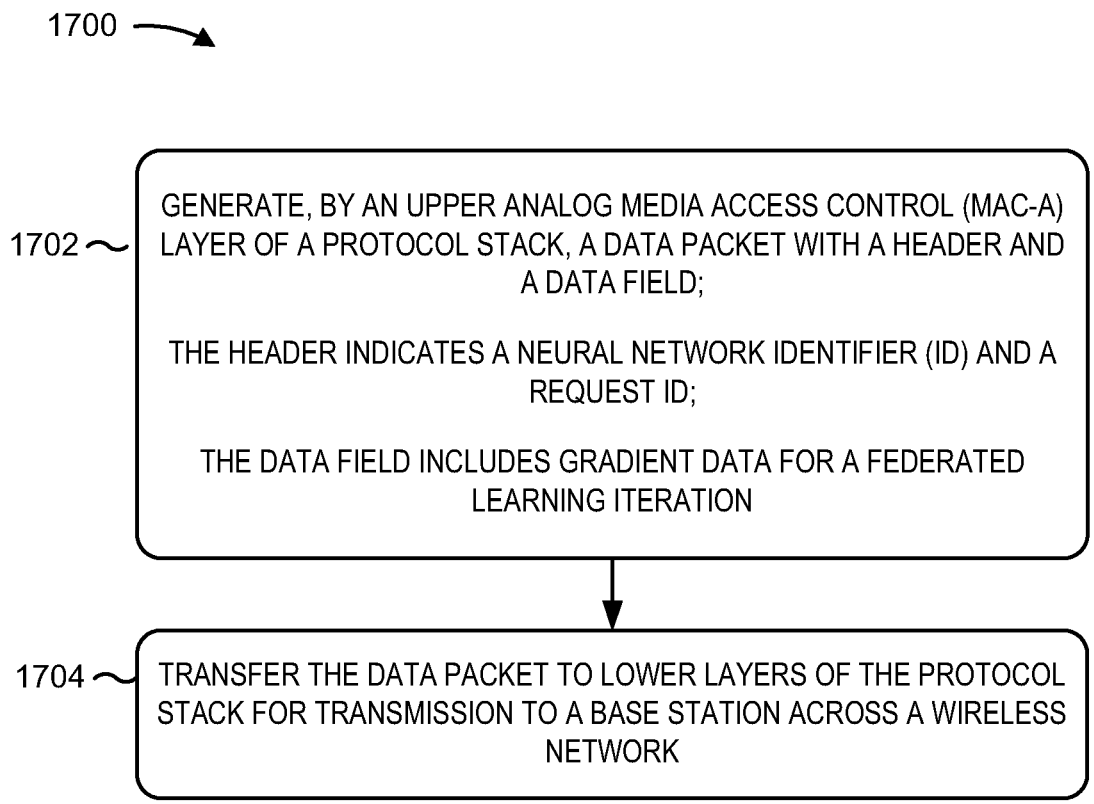
FIG. 17 is a flow diagram illustrating an example process performed, for example, by a user equipment (UE), in accordance with various aspects of the present disclosure.

FIG. 17 is a flow diagram illustrating an example process 1700 performed, for example, by a user equipment (UE), in accordance with various aspects of the present disclosure. The example process 1700 is an example of upper analog media access control (MAC-A) layer functions for an analog transmission protocol stack.

At block 1702, the user equipment (UE) generates, by an upper analog media access control (MAC-A) layer of a protocol stack, a data packet with a header and a data field, the header indicating a neural network identifier (ID) and a request ID, the data field including gradient data for a federated learning iteration. For example, the UE (e.g., using the controller/processor 280 and/or memory 282) may generate the data packet. In some aspects, the gradient data is in sequential order within the data field. In other aspects, the gradient data is grouped by neural network layer and listed sequentially for each neural network layer within the data field.

At block 1704, the user equipment (UE) transfers the data packet to lower layers of the protocol stack for transmission to a network device across a wireless network. For example, the UE (e.g., using the controller/processor 280 and/or memory 282) may transfer the data packet. The lower layers may parse the data packet. In some aspects, the data packet is transmitted to the network without the header Example Aspects Aspect 1: A method of wireless communication by a user equipment (UE), comprising: generating, by an upper analog media access control (MAC-A) layer of a protocol stack, a data packet with a header and a data field, the header indicating a neural network identifier (ID) and a request ID, the data field including gradient data for a federated learning iteration; and transferring the data packet to lower layers of the protocol stack for transmission to a network device across a wireless network.

Aspect 2: The method of Aspect 1, in which the gradient data is in sequential order within the data field.

Aspect 3: The method of Aspect 1, in which the gradient data is grouped by neural network layer and listed sequentially for each neural network layer within the data field.

Aspect 4: The method of any of the preceding Aspects, in which the gradient data is represented in binary notation.

Aspect 5: The method of any of the preceding Aspects, further comprising parsing the data packet by the lower layers.

Aspect 6: The method of any of the preceding Aspects, further comprising transmitting, to the network device, the data packet without the header.

Aspect 7: The method of any of the preceding Aspects, further comprising analog ciphering the gradient data by updating a sign of the gradient data.

Aspect 8: The method of any of the preceding Aspects, further comprising routing different data packets to different cell groups or splitting a bearer based on a neural network.

Aspect 9: The method of any of the preceding Aspects, further comprising discarding data packets from a buffer in the upper MAC-A layer in response to a timer expiring.

Aspect 10: The method of any of the preceding Aspects, further comprising: generating a status report, by the upper MAC-A layer, indicating availability of the gradient data; and transmitting the status report to the network device via a digital protocol stack.

Aspect 11: The method of any of the preceding Aspects, in which functions of the upper MAC-A layer are performed by a digital protocol stack.

Aspect 12: The method of any of Aspects 1-10, in which functions of the upper MAC-A layer are performed by an analog protocol stack.

Aspect 13: An apparatus for wireless communication by a user equipment (UE), comprising: a memory; and at least one processor coupled to the memory, the at least one processor configured: to generate, by an upper analog media access control (MAC-A) layer of a protocol stack, a data packet with a header and a data field, the header indicating a neural network identifier (ID) and a request ID, the data field including gradient data for a federated learning iteration; and to transfer the data packet to lower layers of the protocol stack for transmission to a network device across a wireless network.

Aspect 14: The apparatus of Aspect 13, in which the gradient data is in sequential order within the data field.

Aspect 15: The apparatus of Aspect 13, in which the gradient data is grouped by neural network layer and listed sequentially for each neural network layer within the data field.

Aspect 16: The apparatus of any of the Aspects 13-15, in which the gradient data is represented in binary notation.

Aspect 17: The apparatus of any of the Aspects 13-16, in which the at least one processor is further configured to parse the data packet by the lower layers.

Aspect 18: The apparatus of any of the Aspects 13-17, in which the at least one processor is further configured to transmit, to the network device, the data packet without the header.

Aspect 19: The apparatus of any of the Aspects 13-18, in which the at least one processor is further configured to analog cipher the gradient data by updating a sign of the gradient data.

Aspect 20: The apparatus of claim any of the Aspects 13-19, in which the at least one processor is further configured to route different data packets to different cell groups or splitting a bearer based on a neural network.

Aspect 21: The apparatus of any of the Aspects 13-20, in which the at least one processor is further configured to discard data packets from a buffer in the upper MAC-A layer in response to a timer expiring.

Aspect 22: The apparatus of any of the Aspects 13-21, in which the at least one processor is further configured: to generate a status report, by the upper MAC-A layer, indicating availability of the gradient data; and to transmit the status report to the network device via a digital protocol stack.

Aspect 23: The apparatus of any of the Aspects 13-22, in which functions of the upper MAC-A layer are performed by a digital protocol stack.

Aspect 24: The apparatus of any of the Aspects 13-22, in which functions of the upper MAC-A layer are performed by an analog protocol stack.

Aspect 25: An apparatus for wireless communication by a user equipment (UE), comprising: means for generating, by an upper analog media access control (MAC-A) layer of a protocol stack, a data packet with a header and a data field, the header indicating a neural network identifier (ID) and a request ID, the data field including gradient data for a federated learning iteration; and means for transferring the data packet to lower layers of the protocol stack for transmission to a network device across a wireless network.

Aspect 26: The apparatus of Aspect 25, in which the gradient data is in sequential order within the data field.

Aspect 27: The apparatus of Aspect 25, in which the gradient data is grouped by neural network layer and listed sequentially for each neural network layer within the data field.

Aspect 28: The apparatus of any of the Aspects 25-27, in which the gradient data is represented in binary notation.

Aspect 29: The apparatus of any of the Aspects 25-28, further comprising means for parsing the data packet by the lower layers.

Aspect 30: The apparatus of any of the Aspects 25-29, further comprising means for transmitting, to the network device, the data packet without the header.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication by a user equipment (UE), comprising:
   generating, by an upper analog media access control (MAC-A) layer of a protocol stack, an analog data packet with a header and a data field, the header indicating a neural network identifier (ID) and a request ID, the data field including gradient data for a federated learning iteration; and
   transferring the data packet to a lower MAC-A layer and an analog physical layer (PHY-A of the protocol stack for transmission to a network device across a wireless network.

2. The method of claim 1, in which the gradient data is in sequential order within the data field.

3. The method of claim 1, in which the gradient data is grouped by neural network layer and listed sequentially for each neural network layer within the data field.

4. The method of claim 1, in which the gradient data is represented in binary notation.

5. The method of claim 1, further comprising parsing the data packet by the lower layers.

6. The method of claim 1, further comprising transmitting, to the network device, the data packet without the header.

7. The method of claim 1, further comprising analog ciphering the gradient data by updating a sign of the gradient data.

8. The method of claim 1, further comprising routing a plurality of different data packets to different cell groups or splitting a bearer based on a neural network.

9. The method of claim 1, further comprising discarding the data packet and a plurality of additional data packets from a buffer in the upper MAC-A layer in response to a timer expiring.

10. The method of claim 1, further comprising:
    generating a status report, by the upper MAC-A layer, indicating availability of the gradient data; and
    transmitting the status report to the network device via a digital protocol stack.

11. The method of claim 1, in which functions of the upper MAC-A layer are performed by a digital protocol stack.

12. The method of claim 1, in which functions of the upper MAC-A layer are performed by an analog protocol stack.

13. An apparatus for wireless communication by a user equipment (UE), comprising:
    at least one memory; and
    at least one processor coupled to the at least one memory, the at least one processor configured:
       to generate, by an upper analog media access control (MAC-A) layer of a protocol stack, an analog data packet with a header and a data field, the header indicating a neural network identifier (ID) and a request ID, the data field including gradient data for a federated learning iteration; and
       to transfer the data packet to a lower MAC-A layer and an analog physical layer (PHY-A) of the protocol stack for transmission to a network device across a wireless network.

14. The apparatus of claim 13, in which the gradient data is in sequential order within the data field.

15. The apparatus of claim 13, in which the gradient data is grouped by neural network layer and listed sequentially for each neural network layer within the data field.

16. The apparatus of claim 13, in which the gradient data is represented in binary notation.

17. The apparatus of claim 13, in which the at least one processor is further configured to parse the data packet by the lower layers.

18. The apparatus of claim 13, in which the at least one processor is further configured to transmit, to the network device, the data packet without the header.

19. The apparatus of claim 13, in which the at least one processor is further configured to analog cipher the gradient data by updating a sign of the gradient data.

20. The apparatus of claim 13, in which the at least one processor is further configured to route a plurality of different data packets to different cell groups or splitting a bearer based on a neural network.

21. The apparatus of claim 13, in which the at least one processor is further configured to discard the data packet and a plurality of additional data packets from a buffer in the upper MAC-A layer in response to a timer expiring.

22. The apparatus of claim 13, in which the at least one processor is further configured:
to generate a status report, by the upper MAC-A layer, indicating availability of the gradient data; and
to transmit the status report to the network device via a digital protocol stack.

23. The apparatus of claim 13, in which functions of the upper MAC-A layer are performed by a digital protocol stack.

24. The apparatus of claim 13, in which functions of the upper MAC-A layer are performed by an analog protocol stack.

25. An apparatus for wireless communication by a user equipment (UE), comprising:
means for generating, by an upper analog media access control (MAC-A) layer of an analog protocol stack, an analog data packet with a header and a data field, the header indicating a neural network identifier (ID) and a request ID, the data field including gradient data for a federated learning iteration; and
means for transferring the data packet to a lower MAC-A layer and an analog physical layer (PHY-A) of the protocol stack for transmission to a network device across a wireless network.

26. The apparatus of claim 25, in which the gradient data is in sequential order within the data field.

27. The apparatus of claim 25, in which the gradient data is grouped by neural network layer and listed sequentially for each neural network layer within the data field.

28. The apparatus of claim 25, in which the gradient data is represented in binary notation.

29. The apparatus of claim 25, further comprising means for parsing the data packet by the lower layers.

30. The apparatus of claim 25, further comprising means for transmitting, to the network device, the data packet without the header.

* * * * *